United States Patent
Ratanaphanyarat et al.

(10) Patent No.: US 11,737,627 B2
(45) Date of Patent: Aug. 29, 2023

(54) METHODS FOR SETTING AND PROGRAMMING ZONING FOR USE BY AUTONOMOUS MODULAR ROBOTS

(71) Applicant: ViaBot Inc., Sunnyvale, CA (US)

(72) Inventors: Gregg Ratanaphanyarat, Palo Alto, CA (US); Dawei Ding, Palo Alto, CA (US); John Lee, Sunnyvale, CA (US); Darshan Bhanushali, Sunnyvale, CA (US)

(73) Assignee: ViaBot Inc., Sunnyvale, CA (US)

( * ) Notice: Subject to any disclaimer, the term of this patent is extended or adjusted under 35 U.S.C. 154(b) by 245 days.

(21) Appl. No.: 17/134,103

(22) Filed: Dec. 24, 2020

(65) Prior Publication Data

US 2022/0107644 A1    Apr. 7, 2022

Related U.S. Application Data

(60) Provisional application No. 63/087,179, filed on Oct. 3, 2020.

(51) Int. Cl.
  *A47L 9/28*    (2006.01)
  *A47L 9/00*    (2006.01)
  (Continued)

(52) U.S. Cl.
  CPC ............ *A47L 9/2873* (2013.01); *A47L 9/009* (2013.01); *A47L 9/2852* (2013.01); *A47L 11/24* (2013.01);
  (Continued)

(58) Field of Classification Search
  CPC ...... A47L 9/2873; A47L 9/009; A47L 9/2852; A47L 11/24; A47L 11/4005; A47L 11/4011; A47L 11/4038; A47L 11/4061; A47L 11/4066; A47L 11/4072; A47L 2201/022; A47L 2201/024; A47L 2201/04; A47L 9/2831; A47L 11/4041; A47L 11/00; A47L 11/40; A47L 11/4063;
  (Continued)

(56) References Cited

U.S. PATENT DOCUMENTS 5,991,951 A * 11/1999 Kubo ...................... A47L 11/16
                                                    15/49.1
6,112,143 A *  8/2000 Allen ................... G05D 1/0278
                                                    701/445

(Continued)

*Primary Examiner* — Bhavesh V Amin
(74) *Attorney, Agent, or Firm* — Penilla IP, APC

(57) ABSTRACT

Methods and software for setting parameters for operating a modular robot are disclosed. One method includes receiving, by a server, communications data from a controller of the modular robot. The modular robot has storage for storing program instructions for executing autonomous movement at a location. The method includes sending, by the server, an initial outline for the controller to generate calibrated mapping data for the location. The calibrated mapping data identifies an outline at the location. The method includes sending, by the server, identification of at least two zones at the location, where the at least two zones define different areas at the location. The controller of the modular robot is configured to use the calibrated mapping data for said autonomous movement at the location and the controller is configured to operate a respective work function in each of the at least two zones.

28 Claims, 20 Drawing Sheets

(51) Int. Cl.
*A47L 11/40* (2006.01)
*G05D 1/00* (2006.01)
*G05D 1/02* (2020.01)
*A47L 11/24* (2006.01)
*B60P 1/02* (2006.01)

(52) U.S. Cl.
CPC ....... *A47L 11/4011* (2013.01); *A47L 11/4038* (2013.01); *A47L 11/4061* (2013.01); *A47L 11/4066* (2013.01); *A47L 11/4072* (2013.01); *B60P 1/02* (2013.01); *G05D 1/0088* (2013.01); *G05D 1/028* (2013.01); *G05D 1/0214* (2013.01); *G05D 1/0219* (2013.01); *G05D 1/0223* (2013.01); *G05D 1/0225* (2013.01); *G05D 1/0238* (2013.01); *G05D 1/0251* (2013.01); *G05D 1/0274* (2013.01); *G05D 1/0278* (2013.01); *A47L 2201/022* (2013.01); *A47L 2201/04* (2013.01); *G05D 2201/0203* (2013.01); *G05D 2201/0208* (2013.01); *G05D 2201/0215* (2013.01)

(58) Field of Classification Search
CPC ............ A47L 11/4091; A47L 2201/02; A47L 9/2805; G05D 1/0088; G05D 1/0214; G05D 1/0219; G05D 1/0223; G05D 1/0251; G05D 1/0274; G05D 1/0278; G05D 1/028; G05D 2201/0203; G05D 2201/0208; G05D 2201/0215; G05D 1/0044; A01D 34/008; E01H 1/05; E01H 1/08

See application file for complete search history.

(56) References Cited

U.S. PATENT DOCUMENTS

| | | | | |
|---|---|---|---|---|
| 6,338,013 | B1* | 1/2002 | Ruffner | B60L 3/106 180/443 |
| 6,611,738 | B2* | 8/2003 | Ruffner | G05D 1/0225 342/357.66 |
| 7,805,220 | B2* | 9/2010 | Taylor | G05D 1/0219 318/568.17 |
| 8,584,307 | B2* | 11/2013 | Won | G05D 1/0227 15/340.1 |
| 8,961,695 | B2* | 2/2015 | Romanov | A47L 11/4011 15/340.1 |
| 8,984,708 | B2* | 3/2015 | Kuhe | A47L 5/24 15/319 |
| 10,180,685 | B2* | 1/2019 | Ratanaphanyarat | B25J 9/023 |
| 10,802,499 | B2* | 10/2020 | Ratanaphanyarat | B25J 9/023 |
| 11,331,796 | B2* | 5/2022 | Duffy | B25J 15/0066 |
| 11,378,972 | B2* | 7/2022 | Ratanaphanyarat | G05D 1/0246 |
| 2002/0116089 | A1* | 8/2002 | Kirkpatrick, Jr. | G05D 1/0227 700/245 |
| 2005/0021186 | A1* | 1/2005 | Murray, IV | B25J 9/1666 700/245 |
| 2006/0288519 | A1* | 12/2006 | Jaworski | A47L 11/4036 15/340.1 |
| 2008/0086236 | A1* | 4/2008 | Saito | G05D 1/0251 901/1 |
| 2010/0011529 | A1* | 1/2010 | Won | A47L 11/4091 15/21.1 |
| 2010/0107355 | A1* | 5/2010 | Won | A47L 11/4066 15/246.2 |
| 2011/0043515 | A1* | 2/2011 | Stathis | G01C 15/002 434/118 |
| 2011/0202175 | A1* | 8/2011 | Romanov | A47L 11/4036 700/250 |
| 2012/0169497 | A1* | 7/2012 | Schnittman | G01V 8/20 340/540 |
| 2012/0173064 | A1* | 7/2012 | Won | A47L 9/0466 901/1 |
| 2012/0291809 | A1* | 11/2012 | Kuhe | A47L 9/2805 134/18 |
| 2013/0206177 | A1* | 8/2013 | Burlutskiy | A47L 9/2826 15/319 |
| 2013/0325244 | A1* | 12/2013 | Wang | G05D 1/0214 701/26 |
| 2014/0277691 | A1* | 9/2014 | Jacobus | G05D 1/0274 700/216 |
| 2014/0303775 | A1* | 10/2014 | Oh | B25J 9/0003 901/1 |
| 2016/0144511 | A1* | 5/2016 | Romanov | G05D 1/0253 701/28 |
| 2016/0298970 | A1* | 10/2016 | Lindhe | A47L 11/4066 |
| 2017/0057081 | A1* | 3/2017 | Krohne | B25J 9/08 |
| 2017/0131721 | A1* | 5/2017 | Kwak | G05D 1/0274 |
| 2017/0265703 | A1* | 9/2017 | Park | A47L 9/2873 |
| 2017/0270361 | A1* | 9/2017 | Puttagunta | G06V 20/56 |
| 2017/0282089 | A1* | 10/2017 | Wang | B25J 9/1617 |
| 2017/0312916 | A1* | 11/2017 | Williams | G05D 1/0219 |
| 2017/0358212 | A1* | 12/2017 | Godwin | G08G 5/0039 |
| 2017/0361468 | A1* | 12/2017 | Cheuvront | A47L 9/2857 |
| 2018/0021942 | A1* | 1/2018 | Hummel | G05D 1/0255 700/253 |
| 2018/0055326 | A1* | 3/2018 | Jung | G06T 19/006 |
| 2018/0074508 | A1* | 3/2018 | Kleiner | G05D 1/0274 |
| 2018/0242806 | A1* | 8/2018 | Haegermarck | G05D 1/024 |
| 2018/0284792 | A1* | 10/2018 | Kleiner | A47L 9/2852 |
| 2018/0314254 | A1* | 11/2018 | Bauer | G01C 21/3848 |
| 2018/0333853 | A1* | 11/2018 | Cousins | G05D 1/0276 |
| 2018/0344116 | A1* | 12/2018 | Schriesheim | A47L 9/2852 |
| 2018/0361585 | A1* | 12/2018 | Williams | A47L 11/14 |
| 2019/0248007 | A1* | 8/2019 | Duffy | B25J 15/0066 |
| 2019/0250625 | A1* | 8/2019 | Kleiner | G05D 1/0219 |

* cited by examiner

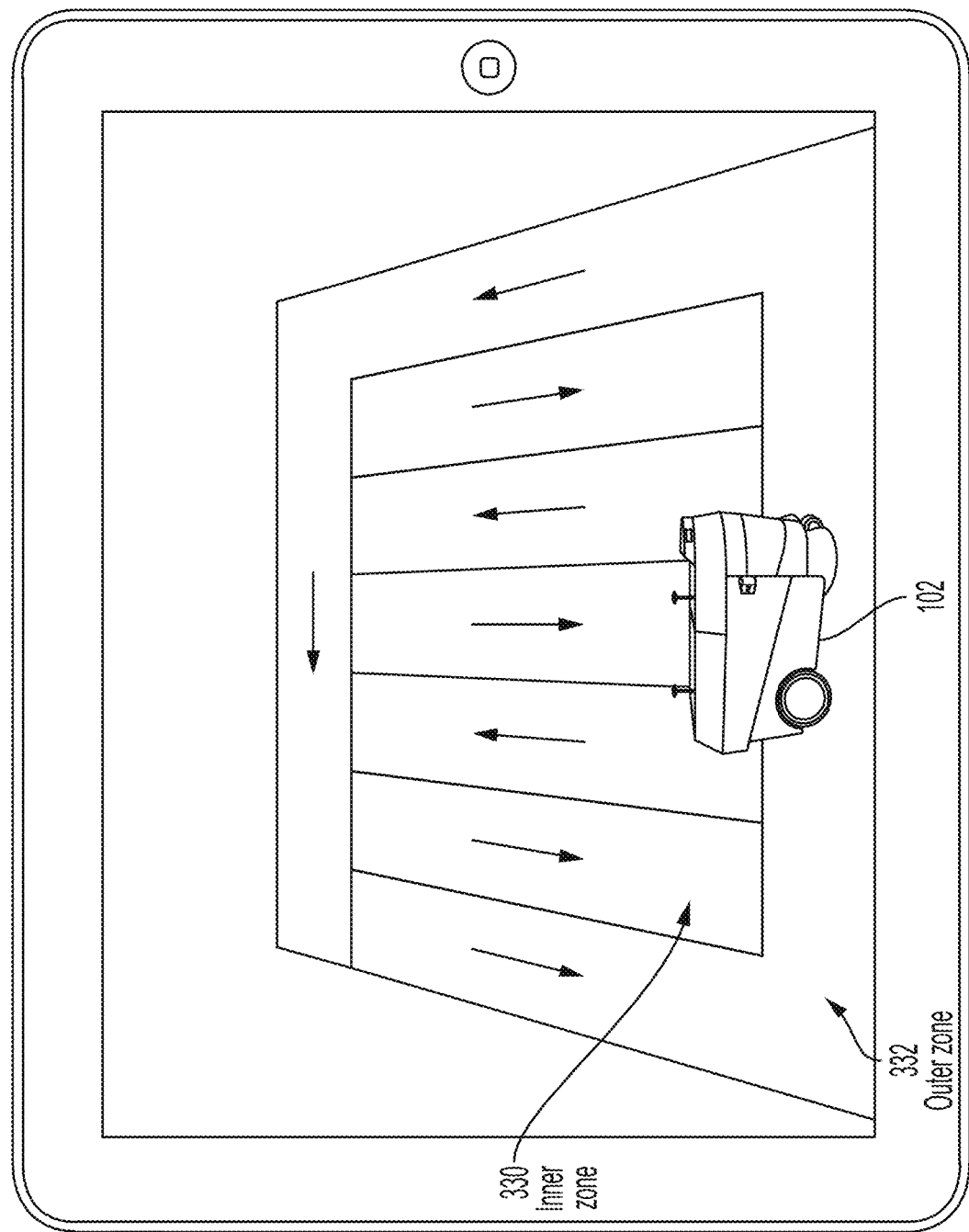

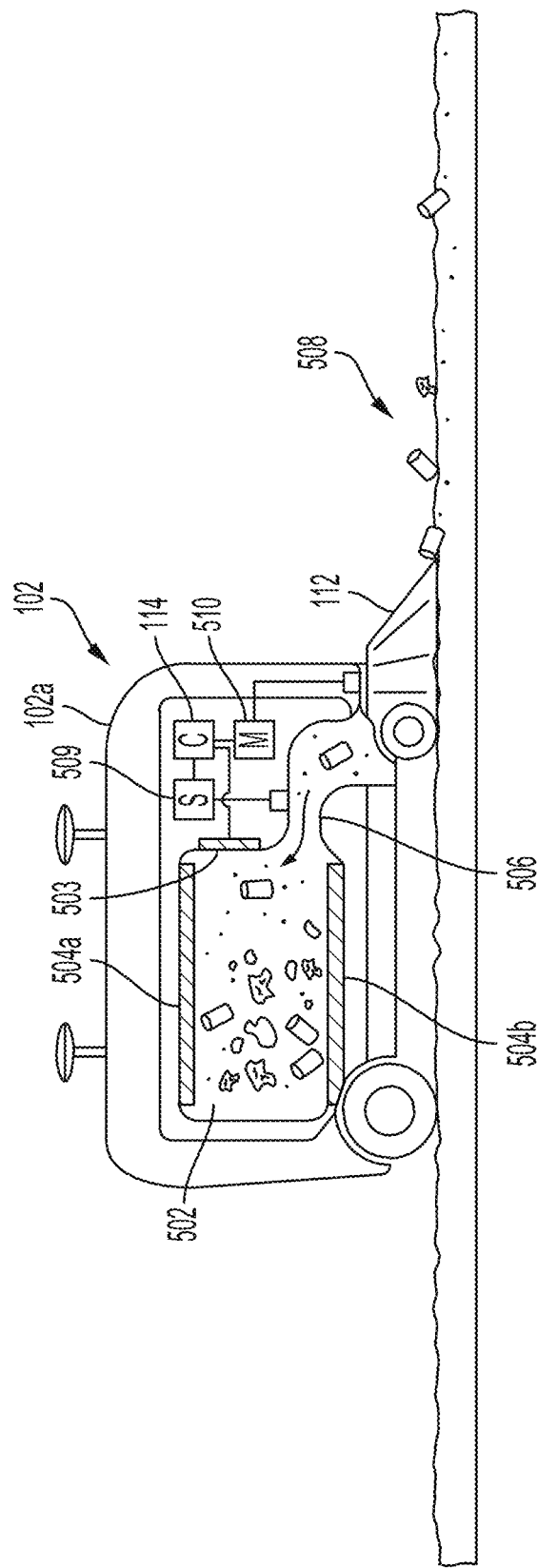
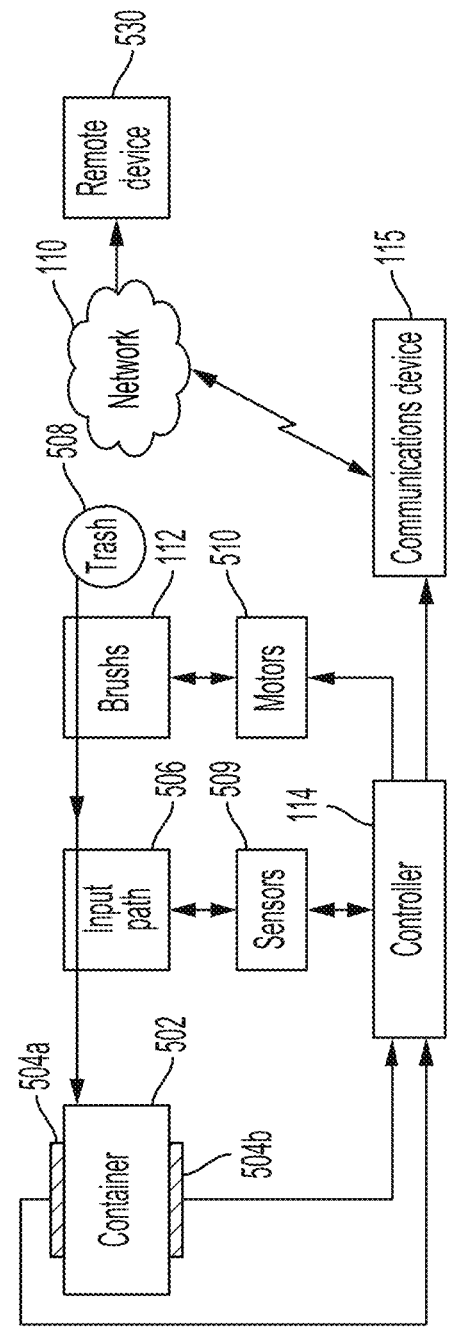
FIG. 10A
FIG. 10B

METHODS FOR SETTING AND PROGRAMMING ZONING FOR USE BY AUTONOMOUS MODULAR ROBOTS

CLAIM OF PRIORITY

This application claims priority to U.S. Provisional Patent Application No. 63/087,179, filed on Oct. 3, 2020, and entitled "Autonomous Modular Sweeper Robot and Dock System," which is hereby incorporated by reference.

RELATED APPLICATIONS

This application is related to U.S. patent application Ser. No. 16/247,482, filed on Jan. 14, 2019, and entitled "Autonomous Modular Robot," which is a Continuation of U.S. patent application Ser. No. 15/152,100, filed May 11, 2016 (U.S. Pat. No. 10,180,685, issued on Jan. 15, 2019), entitled, "Autonomous Modular Robot", wherein U.S. patent application Ser. No. 15/152,100 is a continuation-in-part of U.S. patent application Ser. No. 14/937,633, filed Nov. 10, 2015, entitled "Modular Robot", and claims the priority benefit under 35 U.S.C. § 119(e) of U.S. Provisional Patent Application No. 62/160,059, filed May 12, 2015; and U.S. Provisional Patent Application No. 62/200,814, filed Aug. 4, 2015, the disclosures of which are herein incorporated by reference.

FIELD

The present disclosure relates generally to a multifunctional robot and, more specifically, methods, software, and systems for setting and programming zoning for use by autonomous modular robots, and setting work functions.

BACKGROUND

Autonomous robots are becoming increasingly prevalent due to their ability to automatically perform a variety of tasks that are typically performed manually by humans, or that have been performed with direct human control of a robot. A simple example of an autonomous robot is a robotic floor cleaner such as a robotic vacuum or a robotic mop. These robots are often programmable, allowing users to configure operation times, frequency of operation, and various other settings for the robots. Once programmed, the robots may perform a task, move, and interact with the surrounding environment without requiring further human input. While such robots are becoming more prevalent, the robots are often designed to perform only a single function, such as to clean a surface. As a result, performing a variety of tasks may be difficult and/or prohibitively expensive due to the need to acquire a dedicated autonomous robot for each task that the user wishes to complete.

It is in this context that embodiments of the disclosure arise.

SUMMARY

Methods, systems, computer systems, software, and user interfaces are provided for setting and programming zoning for use by autonomous modular robots. The methods include hardware and/or software systems that are used to interface with and control operation of an autonomous modular robot that is programmed to perform a work function, and set and control zoning and sub-zoning.

In one embodiment, a modular robot is disclosed. The modular robot includes a sweeper module having a container for collecting debris from a surface of a location. The sweeper module is coupled to one or more brushes for contacting the surface and moving said debris into said container. Included is a robot module having wheels and configured to couple to the sweeper module. The robot module is enabled for autonomous movement and corresponding movement of the sweeper module over the surface. A controller is integrated with the robot module and interfacing with the sweeper module. The controller is configured to execute instructions for assigning of at least two zones at the location and assigning a work function to be performed using the sweeper module at each of the at least two zones. The controller is further configured for programming the robot module to activate the sweeper module in each of the two zones. The assigned work function is set for performance at each of the at least two zones.

In some implementations, the work function can be to sweep, to scrub, to polish, to mow or to perform different work functions over zones of a location, and providing remote access to view real-time operation of the modular robot, and to program zones and other control parameters of the modular robot.

In some implementations, the work function is defined by an amount of sweeping per unit square over the surface when the robot module moves over the surface at the location.

In some implementations, work function is defined by a pattern of traverse to be used in each of the at least two zones of the location.

In some implementations, the controller is further configured to execute instructions for assigning one or more sub-zones in one of the at least two zones at the location, and said one or more sub-zones is assigned a sub-work function different than the work function of the respective one of the at least two zones.

In some implementations, the modular robot includes a plurality of cameras for providing computer vision, and a global positioning system (GPS). The controller is configured to use information from the plurality of cameras and the GPS for controlling said autonomous movement of the module robot. The computer vision is used to avoid obstacles detected at the location.

In some implementations, the controller accesses calibrated mapping data for the location to enable the autonomous movement at the location.

In some implementations, the calibrated mapping data is generated based on an initial global positioning system (GPS) coordinate outline of the location generated using an aerial image of the location and a verification of the initial GPS coordinate outline using a GPS device of the robot module. The robot module is moved along points of the GPS coordinate outline to update one or more points of the initial GPS coordinate outline. The update of the one or more points is used to generate the calibrated mapping data that is usable by the controller autonomously move the modular robot when performing the work functions in each of that at least two zones at the location.

In some implementations, the one or more brushes of the sweeper module are coupled to one or more motors that drive rotation. The controller is interfaced with the one or more motors for sensing a current draw experienced by the one or more brushes as the brushes rotate during said sweeping of the location. An increase in current draw is correlated to indicate a fullness level of the container or a hot spot at the location. The hot spot is indicative of an increase in debris encountered at one or more GPS coordinates in one or more of said two or more zones at the location.

In some implementations, the controller is configured to record said hot spot and other hot spots at the location. The hot spots are associated with metadata that provides a description of the hot spot, and the hot spots are used to define an additional work function for addressing the hot spots.

In some embodiments, metadata can used provide context for the robot to perform work functions in particular ways, e.g., in order to maximize efficiency or minimize failure. By way of example, by knowing what direction to focus on sweeping minimizes turns, or knowing where speed bumps and crevices are to reduce speed or to stop sweeping in those areas to avoid hardware failures or delays.

In some implementations, the modular robot includes a sensor for detecting a volume of said debris passing into said container of the sweeper module. The sensor is configured to produce sensor data that is received by the controller. The sensor data is associated with global positioning system (GPS) coordinate data at the location. The sensor data usable to identify regions in the location that have increased or decreased amounts of said debris. In one embodiment, the sensor data is used to generate one or more additional zones at the location or update the work function for said regions.

In another embodiment, a method for operating a modular robot is disclosed. The method includes receiving, by a server, communications data from a controller of the modular robot. The modular robot has storage for storing program instructions for executing autonomous movement at a location. The method includes sending, by the server, calibrated mapping data for the location, the calibrated mapping data identifying an outline at the location. The method includes sending, by the server, identification of at least two zones at the location, the at least two zones defining different areas at the location. The method includes sending, by the server, a work function to be performed by the modular robot for each of the at least two zones. The work function in each of the at least two zones set to be different at said server. The controller of the modular robot is configured to use the calibrated mapping data for said autonomous movement at the location and the controller is configured to operate said respective work function in each of the at least two zones.

In another embodiment, a method for operating a modular robot is provided. The method includes receiving, by a controller of the modular robot, communications data from a server. The modular robot has storage for storing program instructions for executing autonomous movement at a location. The method includes receiving, by the controller, calibration mapping data for the location. The calibration mapping data is used to define calibrated mapping data to outline the location. The method includes receiving, by the controller, assignment of at least two zones at the location. The at least two zones defining different areas at the location. The method includes receiving, by the controller, a work function to be performed by the modular robot for each of the at least two zones. The work function in each of the at least two zones is defined to be different as identified by said server. The controller of the modular robot is configured to use the calibrated mapping data for said autonomous movement at the location and the controller is configured to operate said respective work function in each of the at least two zones.

In one embodiment, the software and systems are configured to enable advanced site mapping using satellite imaging and robot position (local sensor) verification. In one embodiment, zones and sub-zones can be identified and assigned, improving efficiency by customizing work function in specific zones (more or less). In one embodiment, custom setting of work functions for each zone is enabled. In one embodiment, a user interface is provided, e.g., via an application, for selecting zones, and assigning work functions for selected zones. In one embodiment, custom zone identification via user interface (e.g., GUI interface) is enabled via selection pull-downs, dot selection, circles, etc. In one example, the GUI can provide for graphical identifying of hot spots, or selection of pre-defined zones and sub-zones. In one embodiment, zone recommendation can be enabled for selected zones based on historical state of area to be worked. In some cases, the recommended sub-zones are based on detected work. In another embodiment, dynamic hot spot identification is based on robot visual data collection, and systems for enabling switching from programmed tasks to recommend hot spot takes during a session. In one embodiment, dynamic image overlay for UI visualization of zones is provided. In one embodiment, systems for identification of cleaning metrics to areas within zones, and using collected data to build historical map of areas that are likely to collect more trash, are provided.

In one embodiment, recommended traverse patterns can be based on type of work function, or type of surface, or based on historical data.

In some embodiment, work function volume detection and mapping to geolocation in zones is provided. Systems are provided for detecting fullness, including detecting current draw in motors used to run sweeper, wherein increased current draw indicates fullness. Methods and systems further enable using sensors to detect inflow characteristics of material and mapping the inflow characteristics to geolocation in the zone being worked. Using computer vision of area to be worked is further provided, and sensor data of inflow and current draw can be used in combination to identify intensity of workflow and/or need for a second pass or different work function (e.g., scrubber, instead of sweeper).

The foregoing is a summary of certain embodiments in accordance with implementations of the disclosure. It will be appreciated that other embodiments and implementations will be realized upon a full understanding of the present disclosure.

BRIEF DESCRIPTION OF THE DRAWINGS

FIG. 6B shows a zone defined with a pattern that includes an inner zone and an outer zone, in accordance with one embodiment.

FIG. 10A illustrates an example of a sweeper robot having a container, in accordance with one embodiment.

FIG. 10B illustrates an example flow diagram, of the modular sweeper of FIG. 10A, in accordance with one embodiment.

Figure 1A:
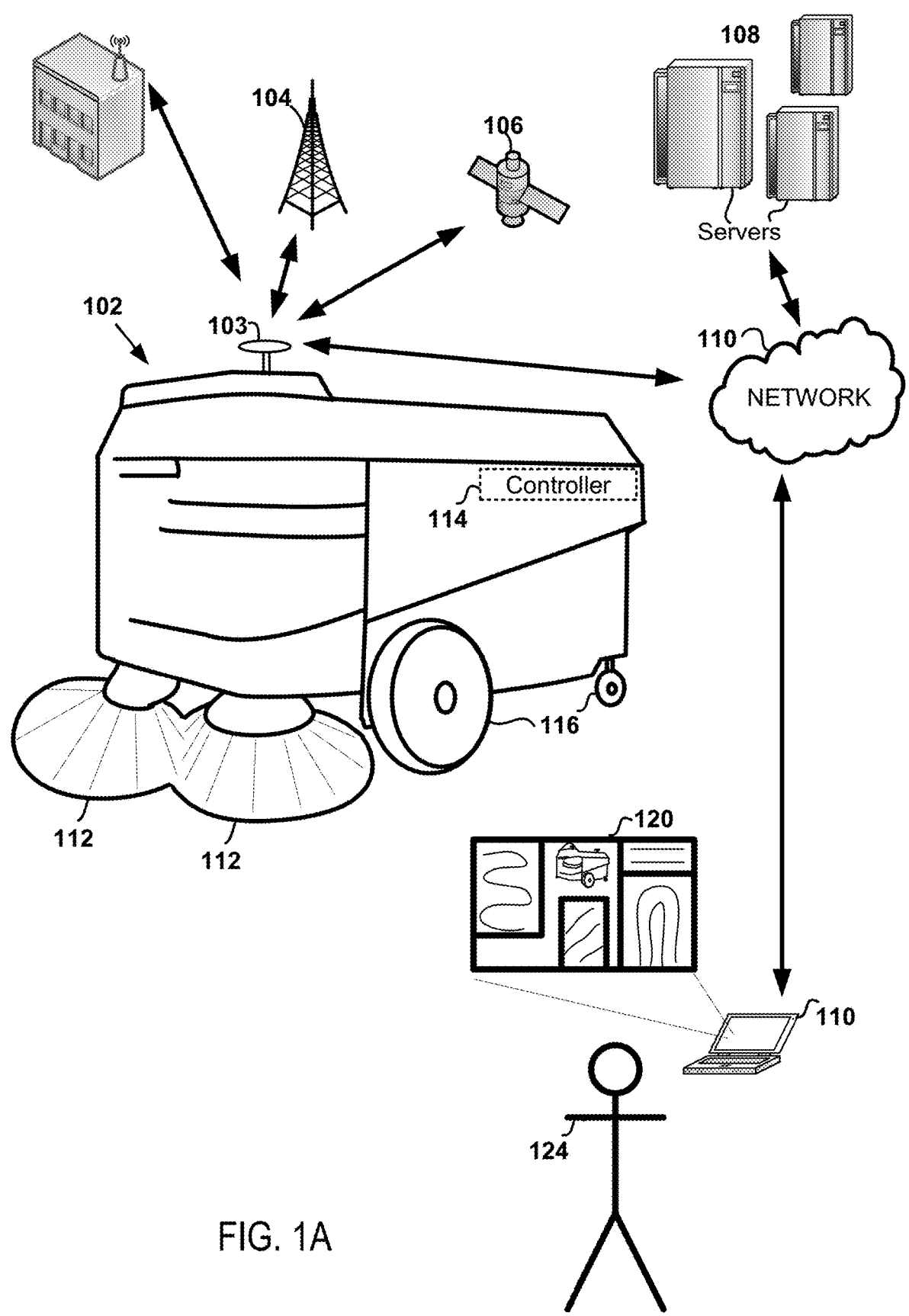
FIG. 1A illustrates a high level diagram of a modular robot 102 that is designed for a sweeping work function, in accordance with one embodiment.

The drawings are provided to illustrate examples of embodiments and are not intended to limit the scope of the disclosure. In addition, features in the drawings are not necessarily to scale.

DETAILED DESCRIPTION

Methods and systems for setting and programming zoning for use by autonomous modular robots are disclosed. The methods include hardware and/or software systems that are used to interface with and control operation of an autonomous modular robot that is programmed to perform as task. Broadly speaking, the autonomous modular robot may be referred to by a number of names, such as, the robot, the modular robot, the sweeper, the scrubber, the autonomous vehicle, the vehicle, the cutter, the mower, the autonomous unit, the autonomous vehicle, and other similar names. The modular robot can therefore be configured to perform different tasks, or work functions. These tasks can include, without limitation, ground cleaning, floor source cleaning, ground scrubbing, ground vacuuming, sweeping of paved surfaces (e.g. parking lots, buildings, roads, etc.), or other types of outdoor or indoor surfaces or spaces. In one example, the modular robot may be configured for sweeping. Such a configuration may include a robot, a sweeper module, and a dock assembly.

The robot is mobile (e.g., has wheels or tracks), and is configured to engage and retain the sweeper module, and maneuver the sweeper module over a given surface to be cleaned. The sweeper module is a modular unit having brushes that sweep debris from the surface into an included collection container. If the work function is to scrub a surface, a scrubber module may be picked up by the robot instead of a sweeper module. The same applies to a mower module, which can be picked up from a respective docking station to enable mowing of a lawn, shrubs, or grass.

In accordance with one embodiment, methods, systems and software are disclosed which describe ways of programming, controlling and assigning a modular robot to a zone and defining the type of work function to be performed in the assigned zone. In one embodiment, assigning zones can include defining customized zones at a location, and defining the type of work function to be performed in each one of the zones. In some cases, an assigned zone can include nested zones, which are sub-zones of one or more defined zones. By way of example, if the work function is to sweep a parking lot, programming functions disclosed herein enable mapping of the parking lot and customizing the mapped parking lot into two or more zones. The zones may be defined, for example, based on the amount of debris detected, known or predicted to be present in certain locations of the parking lot.

If for instance, more debris are located near outer curbs of the parking lot, it is possible to program set a zone for the curb areas, separate from one or more zones that are adjacent to the curb areas. In this example, it should be appreciated that sweeping efficiency can be significantly increased if the module robot spends more time or increases the sweeping passes in the curb zone, and less time is spent sweeping areas of zones that have less debris. This increase in sweeping efficiency addresses a technical problem of sweeping areas in zones which are clean or require less sweeping time or resources. At the same time, setting an increased level of sweeping in areas that are known to be dirty, likely to collect more trash, predicted to collect more trash, and/or identified to have more trash using robot vision (e.g., using cameras of the robot), will improve the cleaning effectiveness of the modular robot.

In still other embodiments, methods are disclosed for enabling efficient mapping of a site to be worked by the modular robot. By way of example, the work function of the modular robot may be to sweep a parking lot. The parking lot may have different areas adjacent to a building, such as a front area, a side areas and a rear area. If the parking lot is for a new customer, deployment of the modular robot to sweep the parking lot will include mapping the parking lot.

In this manner, the modular robot can be programmed with geolocation data identifying the boundaries of the parking lot, e.g., where the customer wishes the modular robot to sweep at a set schedule. In accordance with some embodiments, mapping of the parking lot can be programmed in several ways. One way can include having an operator visit the parking lot and move a global positioning system (GPS) device to specific boundary points. The GPS device will capture the GPS coordinates, which are then recorded as mapping data for the parking lot. The mapping data can then be programmed to the modular robot, wherein a controller saves the GPS coordinates to memory for use in traversing the parking lot for sweeping.

In accordance with another embodiment, a process is used wherein satellite imagery is accessed from a mapping service. Using metadata associated with the satellite imagery, an approximation of an outline of the parking lot is constructed. The outline will include starting GPS coordinates that define a rough boundary of the parking lot. Because the imagery data is not going to produce exact GPS coordinates that are within a few inches or less of accuracy, the starting GPS coordinates cannot be used immediately. Instead, the starting GPS coordinates can be used to identify outer regions of the parking lot that are most likely to be off. Using this method, the controller of the modular robot can be programmed to move about the parking lot to map out the boundary, and verify and update the starting GPS coordinates to define working GPS coordinates. Using this method, it is possible to more efficiently generate mapping data for a parking lot without having to employ personnel to physically walk the site to capture GPS coordinates.

These and other features described herein will not be further described with reference to the following drawings.

FIG. 1A illustrates a high level diagram of a modular robot 102 that is designed for a sweeping work function, in accordance with one embodiment. As shown, the modular robot 102 includes brushes 112, which are utilized to sweep debris collected from surfaces, such as parking lots, hard surfaces, buildings, and the like. In one embodiment, the modular robot 102 includes a sweeping module (not shown) which is contained within the modular robot 102, and the sweeping module is connected to the brushes 112. For more information on the modular interface between the modular robot 102 and the sweeping module, reference may be made to U.S. Provisional Patent Application No. 63/087,179, filed on Oct. 3, 2020, which is herein incorporated by reference. The modular robot 102 includes one or more antenna 103, which is used by the modular robot 102 to communicate wirelessly with one or more different types of communication devices. In one embodiment, the antenna 103 can include the communications device for communicating with the network 110.

The communications device can be an Ethernet controller that allows for Wi-Fi or cellular connection to the network 110. In some embodiments, high-speed cellular can be utilized for the communication, such as 5G communication. In some embodiments, the antenna 103 can be configured to communicate with a cell tower 104, or multiple cell towers 104 for enabling the communication with the network 110. In some embodiments, the GPS transponder can be provided in the modular robot 102, to enable communication with a global positioning system (GPS) device 106. The modular robot 102 may also communicate with local GPS 106a, for higher precision economist movement. Broadly speaking, GPS coordinates obtained from a GPS 106 may not provide sufficient precision and movement when the modular robot 102 is required to perform fine tune movements, based on the work function.

The local GPS 106a, for example, may be installed at the location where the modular robot 102 is to perform its work function. As mentioned above, mapping data can be generated for a location to enable the modular robot 102 to move efficiently about the location in which the work function is to be performed. Network 110 is shown communicating with servers of a data center 108. The servers 108 may be replicated among one or more data centers depending on the location of the modular robot 102 and the desired communication with those robots. For example, modular robots 102 operating in California may utilize local region data centers 108 and modular robots 102 operating in New York may utilize local region data centers 108 to reduce delay. As will be described in greater detail below, the servers of the data center may be utilized to communicate instructions to the modular robots 102. The instructions provided to the modular robot 102 can include information for defining zones at specific locations, where the modular robot 102 is to perform its work function.

The instructions can be custom tailored by the manager of the location where the modular robot 102 is to perform its work function. In some embodiments, the manager is the user 124, which has access to a computer 110 for visualizing the location where the work function is to be performed. The user interface 120 may be provided which highlights the layout of the location, and allows for the user 124 to customize the zones to be used to perform the work functions. The modular robot 102 is shown to include wheels 116 to enable the modular robot 102 to function in its autonomous movement. The autonomous movement of the modular robot 102 can be customized based on a schedule, and can be customized to allow the user 124 to define different work functions to be performed in different zones of a location being managed. The controller 114 of the modular robot 102 includes electronics that provide for autonomous movement of the modular robot 102, and interfacing with electronics of the sweeper module being used by the modular robot 102.

The modular robot 102 includes batteries to enable electric vehicle movement and operation, and the sweeper module included in the modular robot 102 will also include batteries for providing power to perform the work function. In one embodiment, the modular robot 102 is configured to be docked at a docking station, where the modular robot and its batteries can be charged.

Figure 1B:
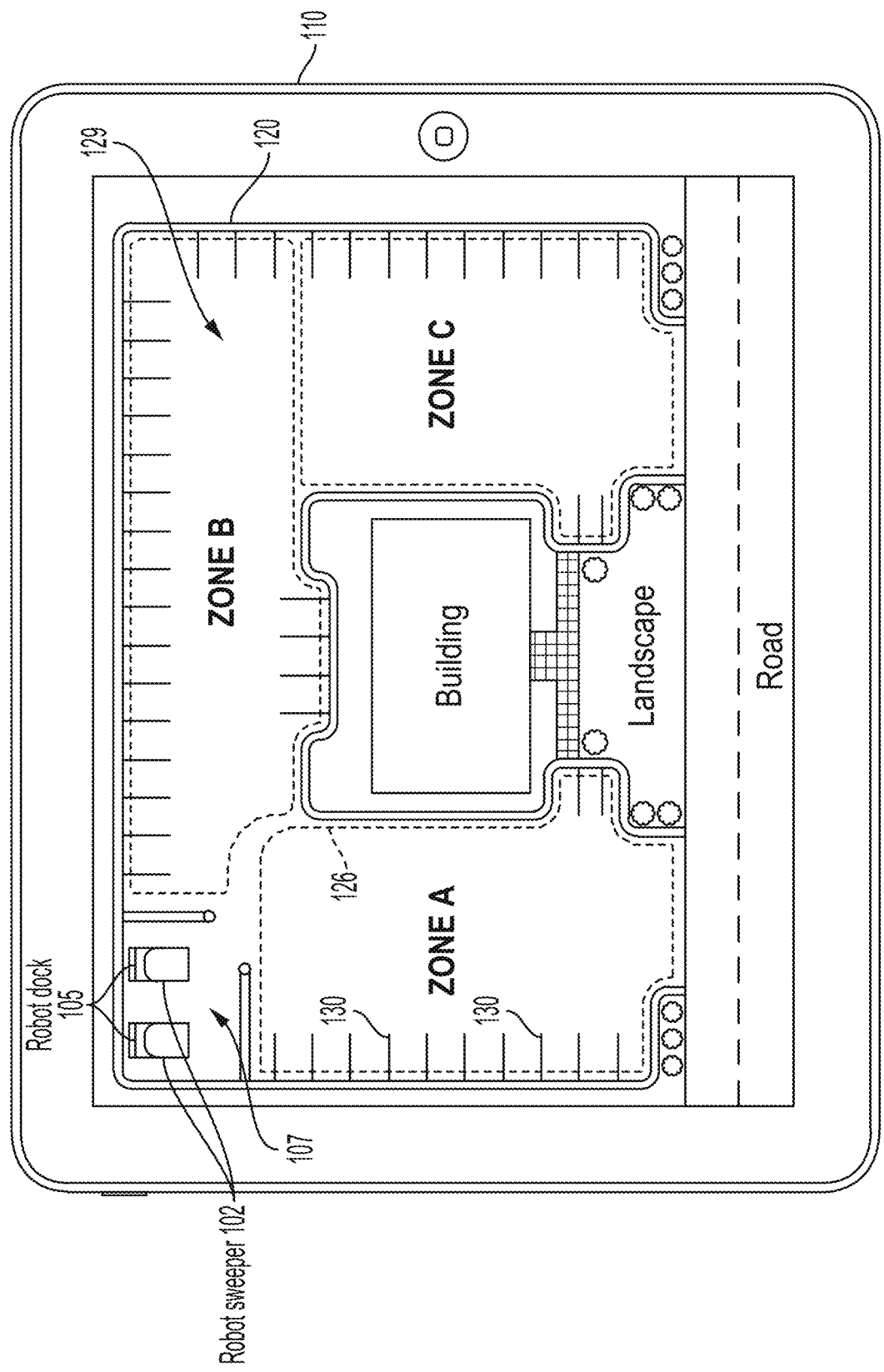
FIG. 1B illustrates a graphical user interface provided by the computer, in accordance with one embodiment.

FIG. 1B illustrates a graphical user interface 120 provided by the computer 110, in accordance with one embodiment. As shown, a location 129 has been defined and associated with mapping data. In one embodiment, the mapping data is calibrated in a two-step process. In a first step, aerial image data of the location can be obtained using an Internet accessible mapping application. The aerial image data can include one or more birds-eye views of the location, such as using the GPS coordinates of the location or the physical address of the location.

Some Internet service providers enable access to high-quality aerial image data of specific map locations. In some embodiments, the image data is not sufficiently of high-quality to generate mapping data for the modular robot 102, but it provides a starting point for approximating the outline that maps the location and generates an initial mapped outline of the location that is to utilize the modular robot for performing one or more work functions. Once the aerial image data has been captured and is of sufficient quality to generate a pre-calibrated outline of the location, the pre-calibrated GPS coordinates are used to generate an initial outline of the location. In one embodiment, an operator that provides customer set up for new users of the modular robot can verify that the initial outline of the location is of sufficient quality for the first step of the mapping process.

If the operator determines that a manual adjustment is required of the pre-calibrated GPS coordinates, e.g. the pre-calibrated initial outline shows a parking structure extending into a building or landscape, the operator can make manual adjustments to the pre-calibrated GPS coordinates. In one embodiment, the process includes estimating the initial outline to be 10% smaller than the initial outline gathered by the high-quality aerial image data. By estimating the initial outline to be smaller, the chance that the modular robot 102 moves into a region that is outside of the true physical outline is reduced. In one embodiment, the first step of the process can be performed from a remote location of the operator, and does not require the operator to visit the location for that generation of the mapping data.

In a second step of the process, the modular robot 102 is provided with autonomous moving instructions that guide the robot to move along the initial outline determined in the first step. This process will require the modular robot 102 utilize its local GPS interface to track the true and accurate coordinates of the location, while utilizing computer vision of one or more cameras of the modular robot 102. The computer vision of the modular robot 102 will allow the modular robot 102 to move outside of the initial outline to find and validate the true and actual outline of the location. This process is continued until the robot has physically and autonomously moved around the location to validate and identify the true outline of the location, to generate calibrated mapping data of the location. The calibrated mapping data of the location can be stored at the modular robot 102, or can be communicated to the servers of the data center 108 for association with the location that is registered for the modular robot 102.

It should be appreciated that the more accurate the aerial image is, the less the modular robot 102 will be required to move about the location to verify and identify the actual physical outline of the location. As used herein, computer vision utilized by the modular robot 102 can include the use of RGB cameras, depth sensing cameras, LIDAR, radar, or a combination of one or more of the different types of computer vision devices and/or apparatuses. These devices are integrated with the controller 114 of the modular robot 102, and can be placed in communication with the network 110 for communication with the servers of the data center 108.

Still referring to FIG. 1B, it is shown in the user interface 120 that an outer outline of the location 129 has been established. The images provided in the user interface 102 can be simulated images of the location 129. In one embodiment, the images provided on the user interface 120 can include a combination of real images obtained from aerial satellite images, combined with graphical user interface simulations of the location. In some embodiments, a mixture of aerial satellite images and overlay images can be provided, such as to illustrate the location of parking stripes 130 more accurately than provided by the aerial satellite images. In some embodiments, the landscape and the building outlines can be provided from the aerial satellite images, while the location services to be processed for a work function can be computer generated images suitable for a user interface. Also shown in the user interface 120, is a robot docking and charging zone 107, where docking stations 105 are provided and connected to power for charging modular robots 102 when docked. As described throughout this application, it should be understood that the modular robot 102 can perform different types of work functions.

These work functions can depend, in some cases, on the type of modular units being autonomous Lee moved by the modular robot 102. If the modular robot 102 is moving a modular sweeper, the modular robot 102 is functioning as a sweeper. If the modular robot 102 is moving a modular scrubber, the modular robot 102 is functioning as a scrubber. If the modular robot 102 is moving a modular polisher, the modular robot 102 is functioning as a polisher. If the modular robot 102 is moving a mower module, the modular robot 102 is functioning as a mower. Example modules are shown below in FIGS. 11A, 11B and 11C, without limitation to other types of modules that can be connected to the modular robot 102 and moved autonomously to perform a work function.

In one embodiment, operators of the modular robot 102 can custom define different zones at the location 129. In one embodiment, the operator of the modular robot 102 is the owner or lessee of the building or parking lot or surface or structure or area where the work function is to be performed. In some embodiments, the zones at the location can be defined by the provider of the modular robot 102. The provider of the modular robot 102 can be the manufacturing company of the modular robot 102 or the leasing agent of the modular robot 102. In some embodiments, the operator of the modular robot 102 and the provider of the modular robot 102 can cooperate together to define the different zones for the specific location. This can be done at set up, and can be utilized during the time when the modular robot 102 will be utilized at the location 129. In the illustration shown in FIG. 1B, three zones have been identified, shown as zone A, zone B, and zone C.

Zone A is shown to be to the left of the building, zone B is shown to be behind the building, and zone C is shown to be to the right of the building, relative to the road. The calibrated mapping data was utilized to set the initial outline of the location 129 with calibrated geolocation positioning data. The set-up of zones at the location will utilize the mapping data and make additional mapping data defining the zones for the location. As illustrated, an outline 126 is within the location 129, and has GPS coordinates defining the outline, which is separate from the zones of zone B and zone C. As will be described below in greater detail, by defining different zones for the location, it is possible to custom design the work functions to be performed in each zone. The work functions define what will be done by the modular robot 102 in each zone, including the frequency, the pattern, and other custom operational settings for the zone. Once the work functions have been identified for the zones and other parameters for how the zones will be managed, the modular robot 102 can perform those tasks autonomously and on the schedule set by the operator or the provider of the modular robot 102.

Figure 1C:
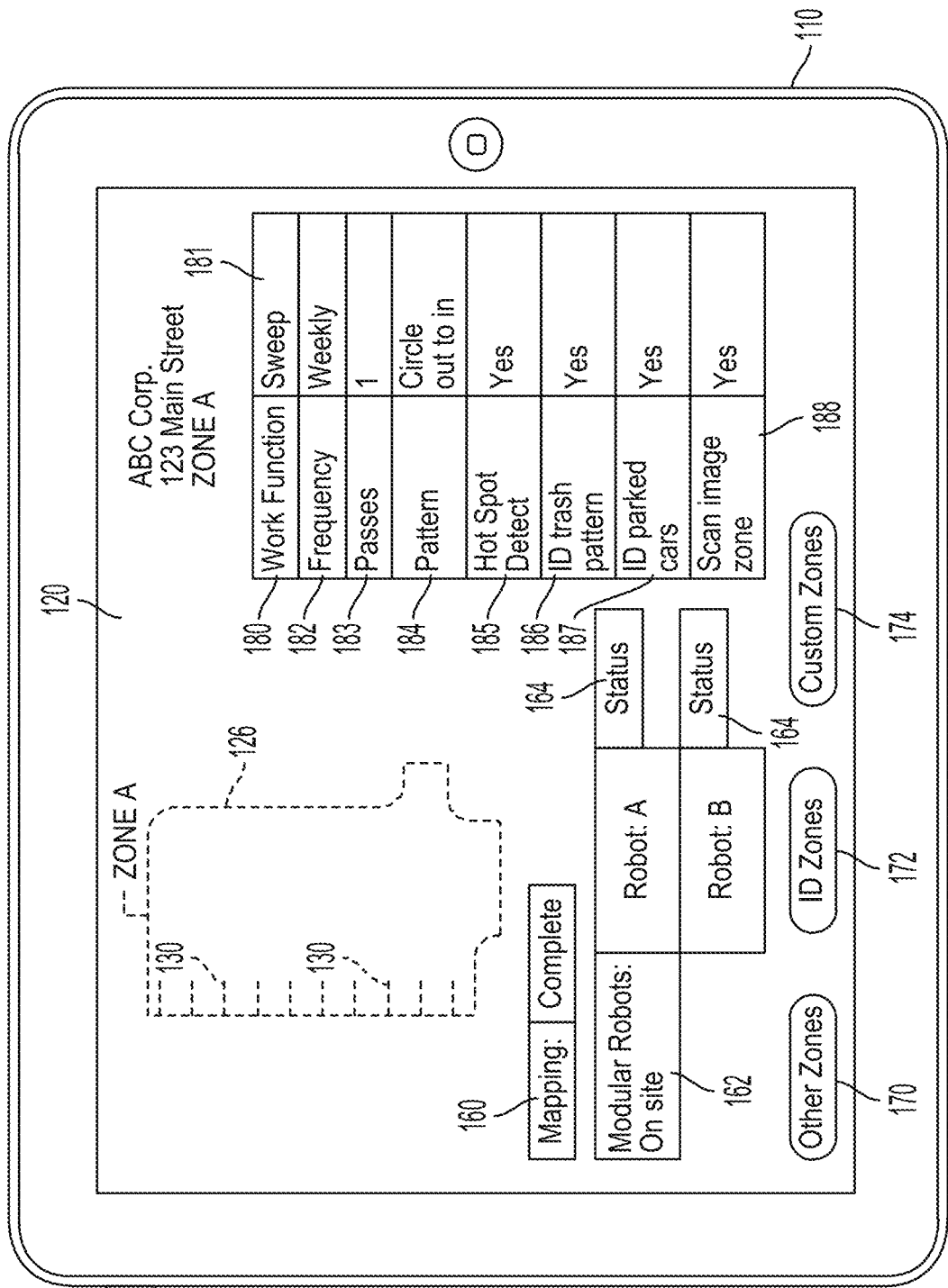
FIG. 1C illustrates an example of the user interface, which allows for customization of each of the zones of a location, in accordance with one embodiment.

FIG. 1C illustrates an example of the user interface 102, which allows for customization of each of the zones of a location, in accordance with one embodiment. The customization of zone A of FIG. 1B is shown by the outline 126, having parking stripes 130. By way of example, the location 129 is for ABC Corp., and is located at 123 Main St. Zone A is shown identified for customization in the user interface 120. In one embodiment, interface 160 illustrates that the mapping data for the zone A has been completed. As mentioned above, mapping data for the location is first calibrated, and then the zones are assigned GPS coordinates for defining the outline 126. In some embodiments, the customization made request to change the mapping 160, and the user can select or deselect complete. By deselecting complete, the user is provided with an option for changing the dimension, size, or configuration of the zone.

In one embodiment, the user interface 120 will identify and interface 162 that show the modular robots that are assigned to the site, i.e., location 129. In this example, robot A and robot B are identified, as being assigned to the location 129. In one embodiment, the user can select interface 164 to determine the status of each of the robots. By selecting status 164, and other interface can provide details regarding the current state of the robot, the charging level of the robot, the geolocation of the robot, past history of the robot, alerts associated with the robot, recommended service for the robot, and other parameters that relate to the robot and/or the robot for the site 129. Further shown are other parameters that can be customized for the zone a, in accordance with one embodiment. For example, the work function 180 can be defined for one or both of the modular robots present were assigned to the location 129. By way of example, in this configuration of zone A, the work function 180 is a sweeping work function 181.

The frequency 182 for operating the work function can be custom set by the operator of the modular robot 102, or by the provider of the modular robot 102, or can be customized on-the-fly by a user of an application having access to the user interface 120. In one embodiment, the user interface 120 can be provided by a web application, which accesses one or more servers of the data center 108. The web application can be viewed through any computing device, such as a desktop computer, a handheld computer, phone, tablet, or the like with a display screen. Once inputs are made via the user interface 120, those inputs can be communicated by the server to the modular robot 102 on demand, periodically, or instantly for programming of electronics of the modular robot 102.

Continuing with the customization of the work function to be performed by one or more of the robots 102, it is possible to identify the number of passes 183 that the modular robot 102 will perform along a defined path. The path can be defined by a pattern 184, which is defined for moving the modular robot over the surface at the location 129. By way of example, the pattern can be defined in any number of customized ways. The example shown is to provide a pattern 184 that is a circle that moves the robot from out to in. The number and types of patterns 184 that can be defined for a specific zone are many, and some examples are shown, without limitation, with reference to FIGS. 6A through 6C.

In one embodiment, the programming of the modular robot 102 can also include making a setting that request the robot to detect hot spots 185. A hot spot can be a point or region at the location 129 that requires further attention, is associated with a condition that requires additional work function activity, is associated with a hazard, is associated with an incident, or is associated with a recommendation.

The types of hot spots can vary, and the modular robot 102 is configured to identify hot spots and associate the various hot spots to specific geo-locations during its autonomous movement about the location, e.g., when performing a work function. In one embodiment, the customization can request that information regarding trash patterns 186 be identified. A trash pattern can be identified using historical data of work functions by the modular robot 102 when performing sweeping functions at a location. By way of example, if the modular robot 102 detects over time that the debris is collecting most frequently near the entrance of a building, when a threshold amount of times it is detected that the modular robot collects excess debris from the location, that trash pattern can be identified.

In one example, the ID of trash patterns 186 can include identification of descriptive data of where trash is most commonly accumulating. It is possible that trash accumulates near and around curbs, or near the rear of the parking structure, or the entrance of the building, etc. Therefore, using historical trash collecting patterns and probabilistic computations, it is possible to predict where future trash patterns will occur at specific locations. Utilizing this information, it is possible to set a recommendation of adjustment to one or more of the zones for the location 129, and/or adjust the number of passes 183, or the like. In one embodiment, identification of parked cars 187 can also be performed. For example, if a location has parking where vehicles are impeding the work function, the identification and location of those vehicles parked will be identified.

For instance, by identifying where cars are parked during a scheduled work function, it is possible to later return and complete unfinished work functions for a specific zone. In some embodiments, it may be preferred to adjust the schedule of the work function to avoid as many cars as possible. Information regarding parked car history, and time schedules for the least number of parked cars can be used to formulate recommendations for setting the schedule for performing work functions at specific locations 129. The user interface 120 can also provide a user interface for setting the scanning of images for a zone 188.

In one embodiment, image data is collected by the modular robot 102. The image data can include images of the parking location, including markings on the ground, cars parked, and obstacles avoided, and other monuments located in and around the parking areas or structures where the modular robot 102 is to perform a work function. In some embodiments, in generating images of a zone, it is possible for images collected by the modular robot 102 to be used to augment images representing the zone. For instance, in the example outline of zone A in the user interface 120 of FIG. 1C, the parking stripes 130 can be illustrated as an overlay showing the actual parking stripes of the zone. Thus, augmented imagery can be utilized to represent more accurately the zone that is being processed by the work function, and a history of images can also be accessed utilizing the user interface 120.

Further illustrated our other user interface functions such as selection of other zones 170. By selecting other zones 170, the user can then set configurations custom for that other zone, e.g., as was done for zone A. The user interface 120 may also have a function 172 for identification of zones. This function would allow the user to create additional zones or creates descriptors that identify the zones in a custom format. Interface 174 provides for access to a custom zone interface. The custom zone interface would allow the user to select specific regions at the location and generate geolocation data for those custom regions. The custom region would then be associated with a zone that can be interfaced with and customized for the assigned work function.

Figure 1D:
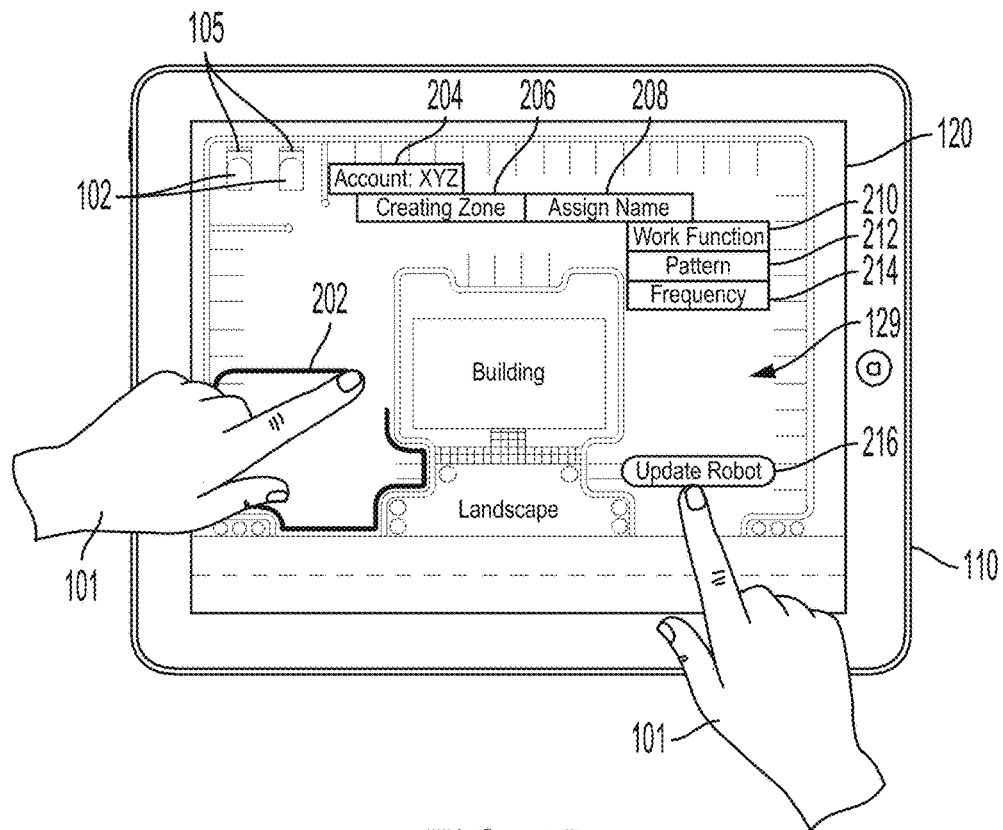
FIG. 1D illustrates an example of the computer being a tablet computer that has touch input, in accordance with one embodiment.

FIG. 1D illustrates an example of the computer 110 being a tablet computer that has touch input, in accordance with one embodiment. Once a user logs into the account utilizing an Internet application, the users account for XYZ can be provided into an interface 204, or the like. In this example, the user is able to create a zone 206. By selecting to create a zone, the user is able to assign a name 208 to the custom zone. In one embodiment, the created zone can also be associated with a work function 210, a pattern 212, a frequency 214, and other control features. By way of example, once the zone has been created, further customization for the zone can be performed using other interface functionalities shown in user interface 120, in FIG. 1C. The interface functionalities illustrated in FIG. 1C are only by way of example, and other functionalities may be added, adjusted, or modified. Further, it should be understood that the interface buttons, icons, and locations can be adjusted based on the design desired by the user interface creator. In some embodiments, multiple user interfaces may be generated for the application, and the user interface 120 is only one of many interfaces provided via the application utilize for interfacing with the modular robot and the customization of zones.

The user interface 120 of FIG. 1D shows an overlay map of the location 129, and provides the user with the ability to create another zone or adjusted a current zone of the location. In one example, the creation of a zone can also be done utilizing a tracing function, which allows the user to drag his or her finger over the locations where a zone is to be created. The tracing 202 is shown being done by a touch input 101, on the display of the computer 110. Once the zones have been created, and update function can be performed by selecting update robot 216. As mentioned above, updates can be made automatically by the server, e.g., when update data has been received by the robot or by one or more inputs made at the user interface 120 of the application. In this example, the user may wish to confirm the changes or additions of zones by selecting the update robot 216 function.

Figure 1E:
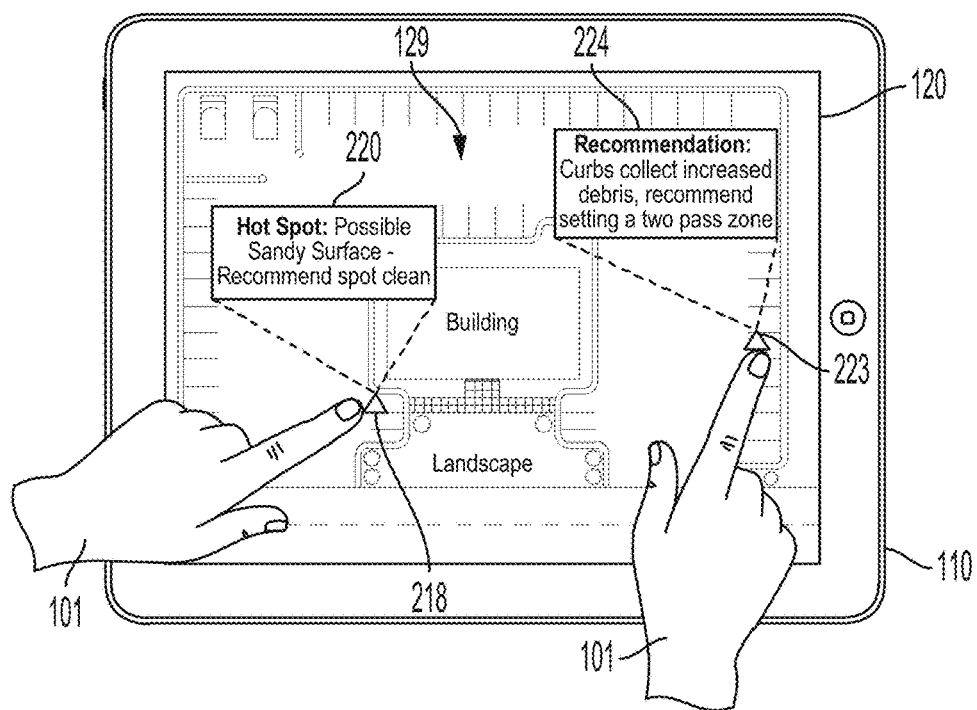
FIG. 1E illustrates an example of the location, where a hot spot and a recommendation are illustrated as pop-ups on the display screen, in accordance with one embodiment.

FIG. 1E illustrates an example of the location 129, where a hot spot 220 and a recommendation 224 are illustrated as pop-ups on the display screen, in accordance with one embodiment. In addition to providing notifications utilizing a notifications module of the application utilize for managing the modular robot 102, notifications can also be illustrated graphically on the display screen, with specific reference to specific points at the location. The points are shown as point 218 that corresponds to hot spot 220, and point 223 that corresponds to recommendation 224. In one example, when the user provides touch input 101 at point 218, the hot spot 220 will be shown. In this example, the user is notified that at the identified point, it is possible that a sandy surface is present. It is possible that the modular robot 102 identified that the surface is sandy based on the type of material being picked up and identified by one or more inflow sensors during a sweeping operation. It is also possible to identify the type of material on the surface by monitoring the current draw on the motors that drive the sweeper brushes 112 of the modular robot 102.

In some embodiments, multiple inputs are utilized to predict the type of surface or material that may be problematic or require further work functions. In one embodiment, machine learning can be utilized to learn from the capture of debris from different surfaces over time. Different learning inputs can be utilized, such as the current draw experience by motors of the modular robot 102, characteristics identified by input sensors, imaging sensors identifying material being picked up, cameras identifying material over which the modular robot 102 is traversing, and feedback from persons or operators at the location 129. These inputs can be analyzed to extract features representing the data being collected, and classifiers can be used to identify characteristics of those features.

Deep learning models can then be constructed utilizing the extracted features and classifiers. Models can therefore be used to identify characteristics of the debris, substances, or materials being encountered during operation of the work function. Utilizing such models, a recommendation engine can query the model to identify the type of material that may be trigger a hot spot or trigger the need to notify of a hot spot. Utilizing the identification characteristics of the material or debris associated with a hot spot, a recommendation engine can provide descriptive information of what types of actions should be taken to address the hot spot. In this example, the recommendation for the hot spot is to spot clean the point 218 where the hot spot 220 was identified.

Similarly, using one or more machine learning models, it is possible to learn metrics associated with cleaning patterns for the location 129. For instance, if over time it is determined that the curbs that identify where vehicles are parked in the parking lot tend to collect an increased amount of debris, the recommendation can be generated for that identified hot spot. The recommendation can include, for example, setting a zone that will require at least two passes in a specific area identified, i.e., curbs. It should be understood that the type of work function will determine the amount of additional work function to perform, and/or remedial measures that should be taken or recommended to be taken by the modular robot to address the hot spot. By way of example, if the surface being worked on is by a polisher robot, the system can recommend, to change the polisher pads, to change the material used for polishing, to change the pressure used to polish, or to modify some other parameter. Similarly, other example recommendations can be made for other types of work functions, e.g., mowing the lawn, scrubbing the floor, vacuuming a surface, etc.

Figure 2:
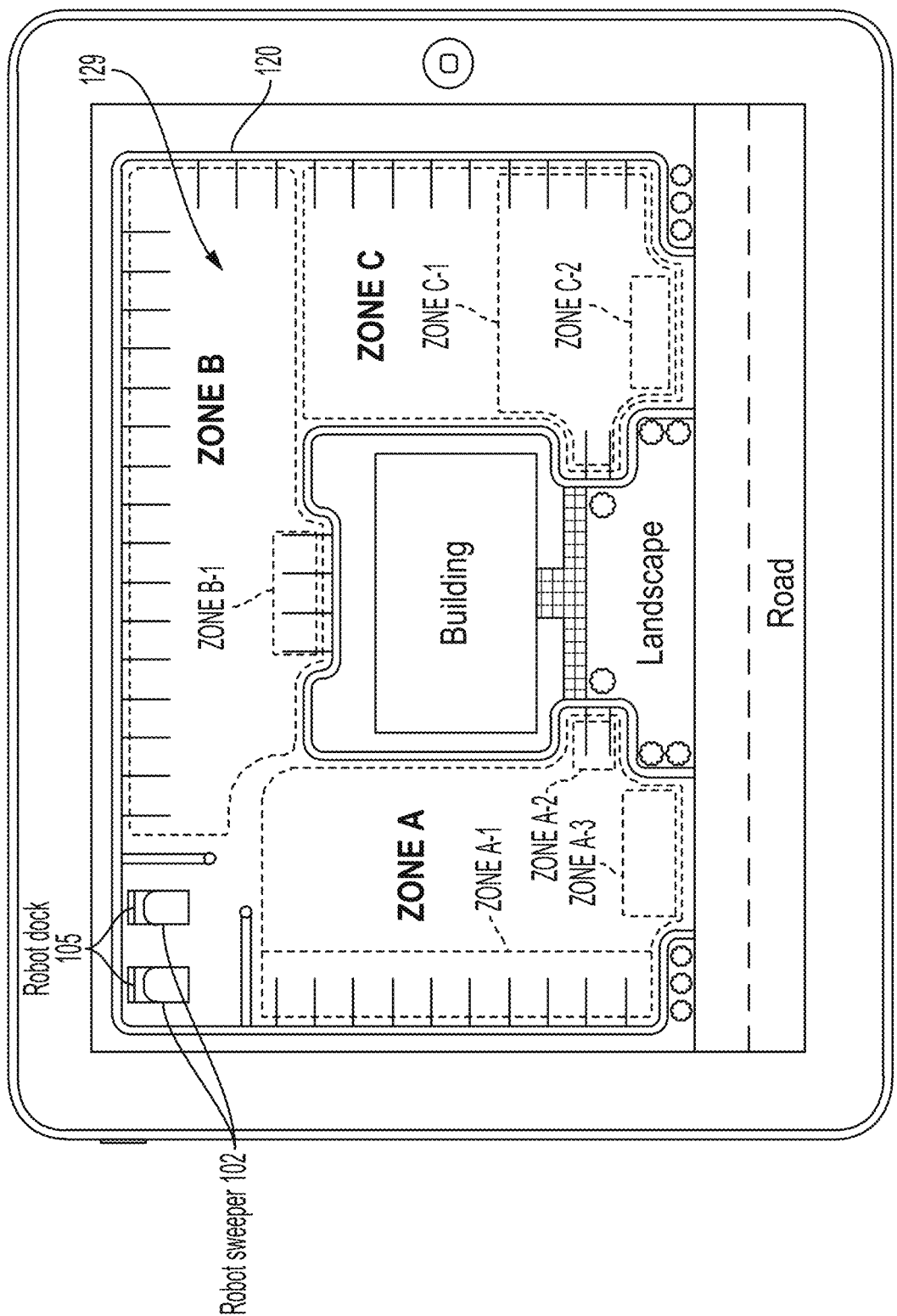
FIG. 2 illustrates an example of location having various zones, in accordance with one embodiment.

FIG. 2 illustrates an example of location 129 having various zones, in accordance with one embodiment. In this example, in addition to having zones A through C, is possible to define sub-zones. Sub-zones are zones that fit within existing zones. By way of example, in zone A, sub-zones A-1, 2, and 3 were defined. The sub-zones can be identified, for example, when additional work function is required for those regions. In the illustrated example, sub-zone A-2 is an area near the entrance of the building, and debris has been noticed to accumulate in that area more than in other areas. Sub-zone A-3 is an area at the entrance of the parking lot, and this area was identified to collect oil from entering vehicles. The work function for sub-zone A-3 can include scrubbing the surface utilizing one or more scrubbing detergents, in addition to sweeping that was assigned to zone A.

Similarly, sub-zone A-1 may be identified for the area where more vehicles parked and debris is collecting more often than in other parts of zone A. Sub-zone B-1 is also shown to be part of or lie within zone B. Zone C is shown to include two nested sub-zones, e.g. sub-zone C-1, and nested sub-zones C-2. As discussed above, each of the sub-zones can be assigned a different work function. In one embodiment, the additional work function of a sub-zone can be in addition to the work function of the zone. In another embodiment, the work function of the sub-zone can be defined as the only work function to be performed in that sub-zone, and the work function for the zone is not performed in the sub-zone. In other embodiments, combinations of the two scenarios described above can be implemented, as defined by the user or operator utilizing one or more of the user interfaces of the application for controlling the modular robot 102.

Figure 3:
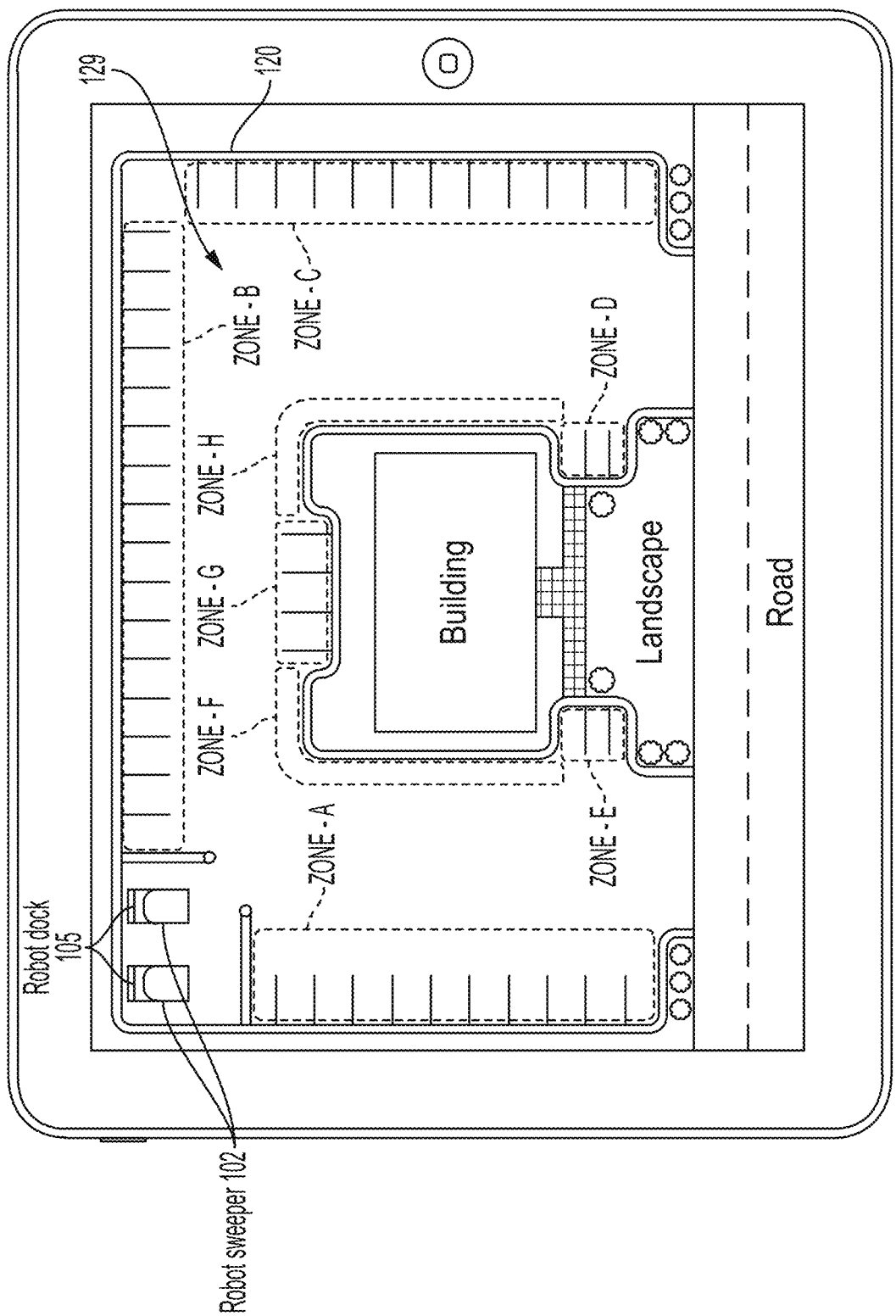
FIG. 3 illustrates another example where zones are created for the location, where less than the entire surface of the location is processed by a work function, in accordance with one embodiment.

FIG. 3 illustrates another example where zones are created for the location 129, where less than the entire surface of the location 129 is processed by a work function, in accordance with one embodiment. As shown, the middle area of the parking lot for location 129 is not programmed to be cleaned or process for a work function. However, the zones are targeted for areas known to be regions where debris collects, if the work function is sweeping. As shown, zone A covers the parking spots on the left side of the parking lot, zone B covers the parking spots in the back, zone C covers the parking spots on the right, zone D covers the parking spots at the right entrance, zone E covers the parking spots at the left entrance. In addition, there is a curb that surrounds the building and is adjacent to the landscape that surrounds the building. This area is identified with a zone F and a zone H. It should be clear that the customization of the zones does not require all surfaces of the location 129 to be processed with a work function, but can allow customization of regions as well as the amount of work function, patterns, and other definitional instructions for the modular robot 102 to perform in the location 129.

Figure 4:
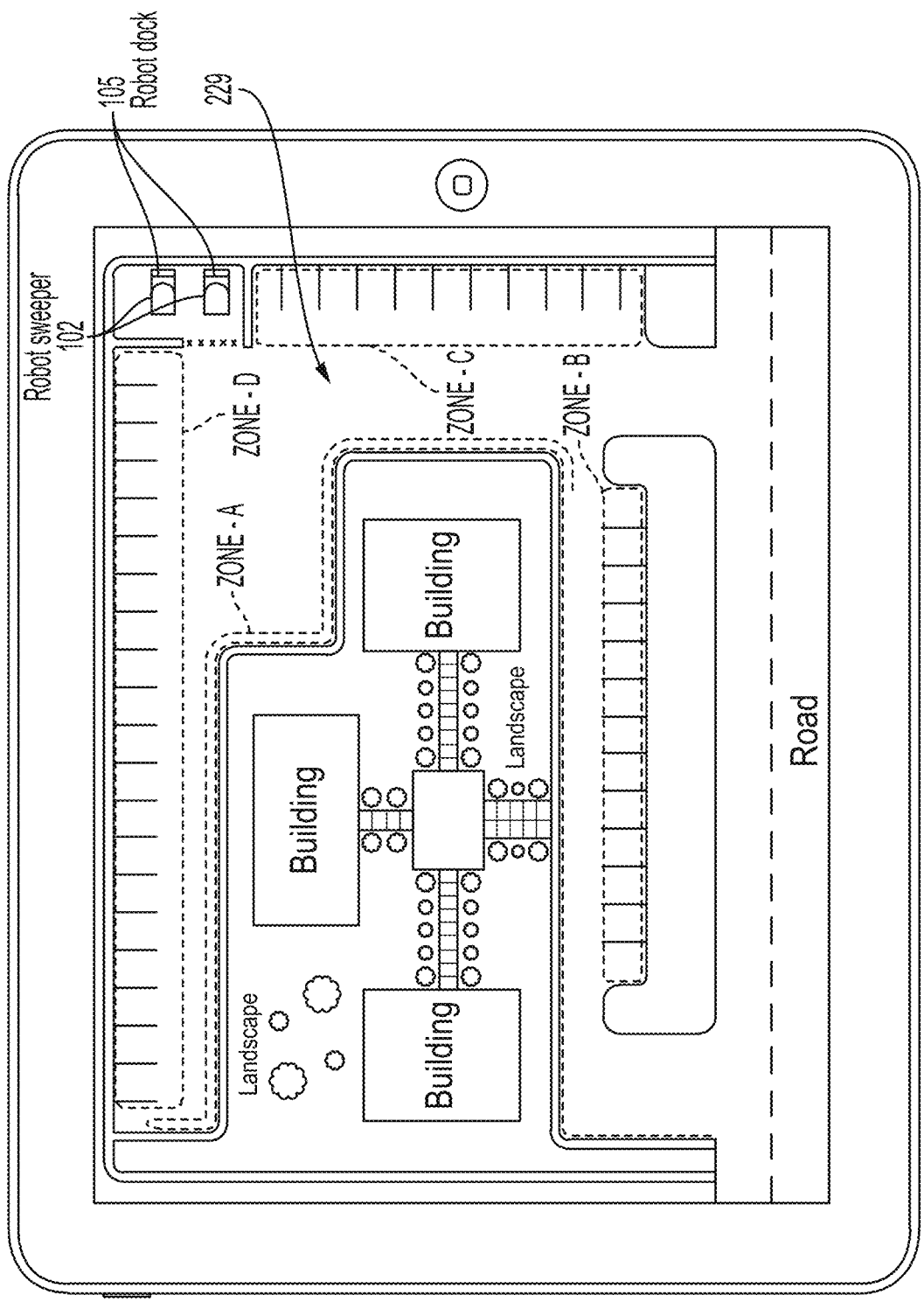
FIG. 4 illustrates an example of another parking area that would be processed by a modular robot, in accordance with one embodiment.

FIG. 4 illustrates an example of another parking area that would be processed by a modular robot 102, in accordance with one embodiment. This region has a location 229 that has been mapped and calibrated to identify the GPS coordinates that will be followed by the modular robot 102. In this case, customized zones A, B, C and D are set by the operator or manager of the modular robot 102. Similar customization can be performed for the types of work functions that will be conducted by the modular robot 102 at the location 229.

Figure 5:
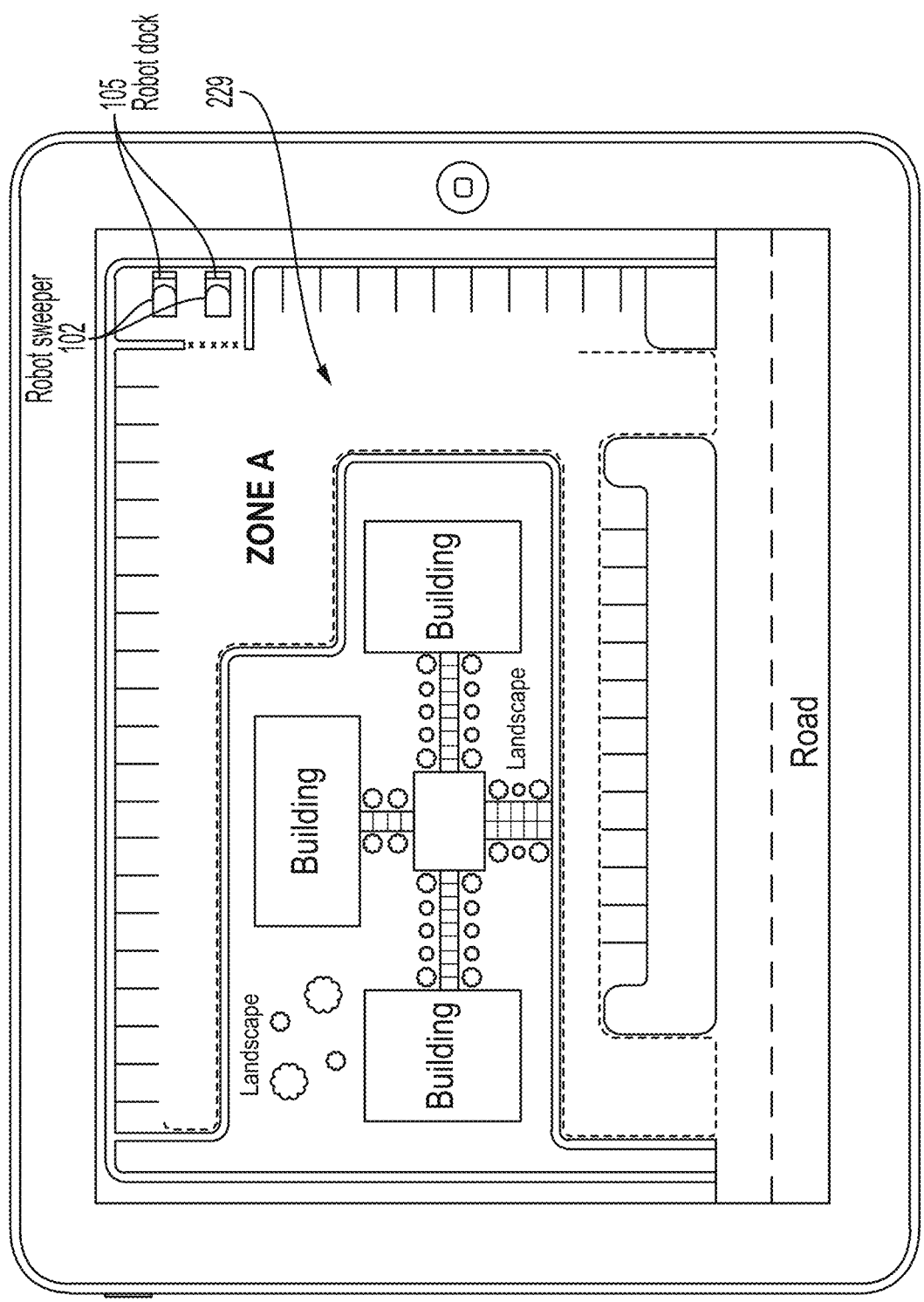
FIG. 5 illustrates an example where a zone A is defined for only processing the pathways in a location, in accordance with one embodiment.

FIG. 5 illustrates an example where a zone A is defined for only processing the pathways in location 229. By way of example, zone A of FIG. 5 can be a separate zone from the zones identified in FIG. 4. Different work functions can be assigned to different zones, and different schedules can be assigned to the different work functions and zones.

Figure 6A:
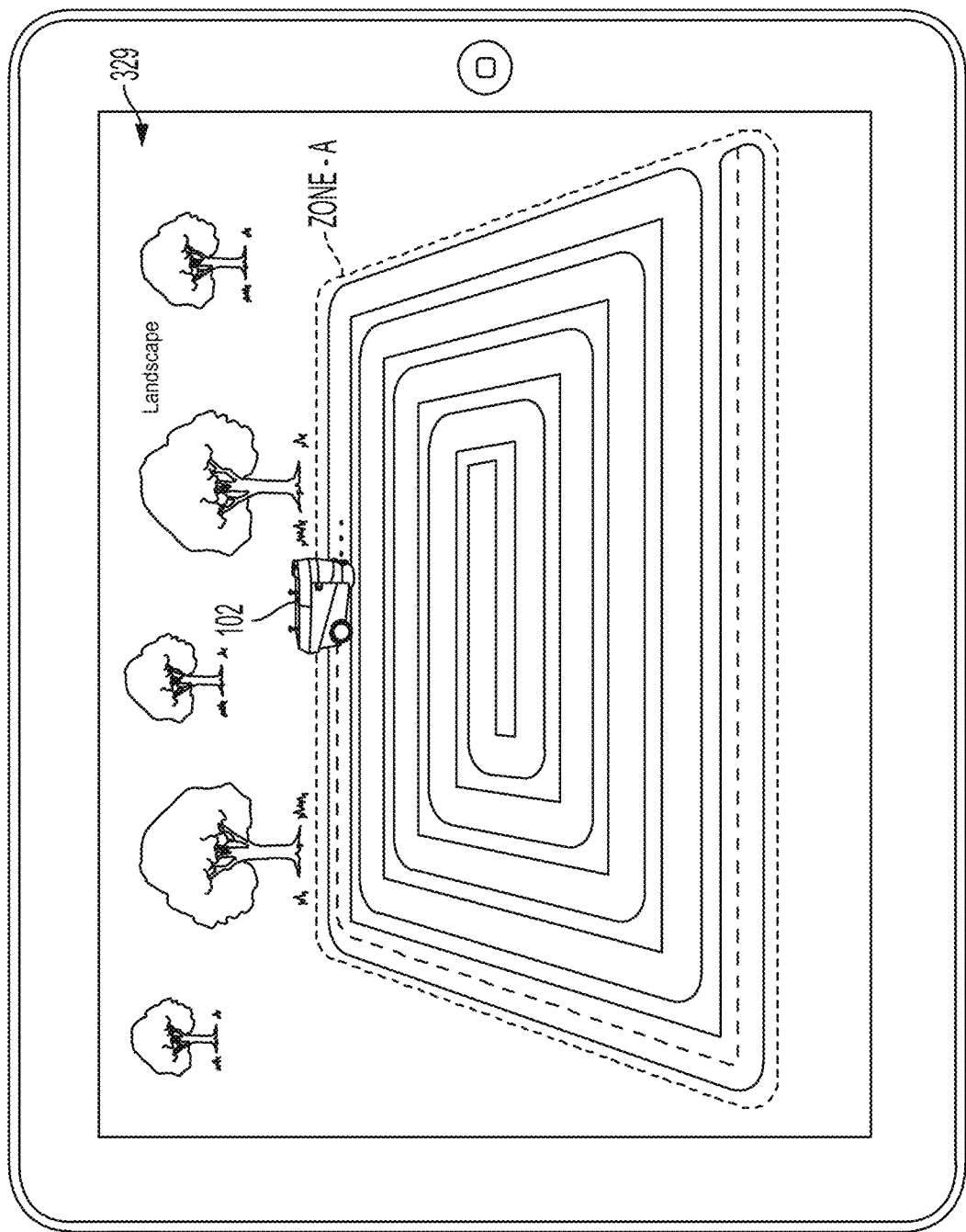
FIG. 6A illustrates an example of a zone A, where a specific pattern is identified for the modular robot, in accordance with one embodiment.

FIG. 6A illustrates an example of a zone A, where a specific pattern is identified for the modular robot 102. In this example, zone A is adjacent to landscape 329, and the GPS coordinates of the zone A have been defined and calibrated, as described above. In some embodiments, the calibration or setting of the mapping data for the zone can be performed using manual point identification methods. For example, instead of performing the two-step process described above, it is possible to have an attendant visit the sites and mark different locations and corners at the parking lot, in order to define the accurate GPS coordinates that define the zone. It should be understood that the definition of zones can be performed by other ways, and coordinate verification and assignment can be validated by operators or using the modular robot 102 and its vision systems.

In the example of FIG. 6A, the pattern defined for zone A is a circular pattern, which will start at the center and work out in a spiral. Alternatively, the circular pattern can be set to start at the center and spiral to the perimeter, so long as the zone is covered by the work function, e.g. sweeping. In some embodiments, it is preferred to use the spiral pattern, since the breed may be push toward the center and sweeping can be performed from the outside in to more effectively collect debris. In other embodiments, the pattern can be set depending on the work function and the environment of anticipated debris, surface conditions, materials to be processed, or the like.

In FIG. 6B, the zone is defined with a pattern that includes an inner zone 330 and an outer zone 332. As shown, the outer zone includes moving the modular robot 102 to surround the perimeter. If the work function is a sweeping work function, the breeze may be pushed away from the outer perimeter and in toward the inner zone 330. The modular robot 332 can then autonomous remove to perform an alternating one way and then reversing the other way to complete the inner zone processing.

Figure 6C:
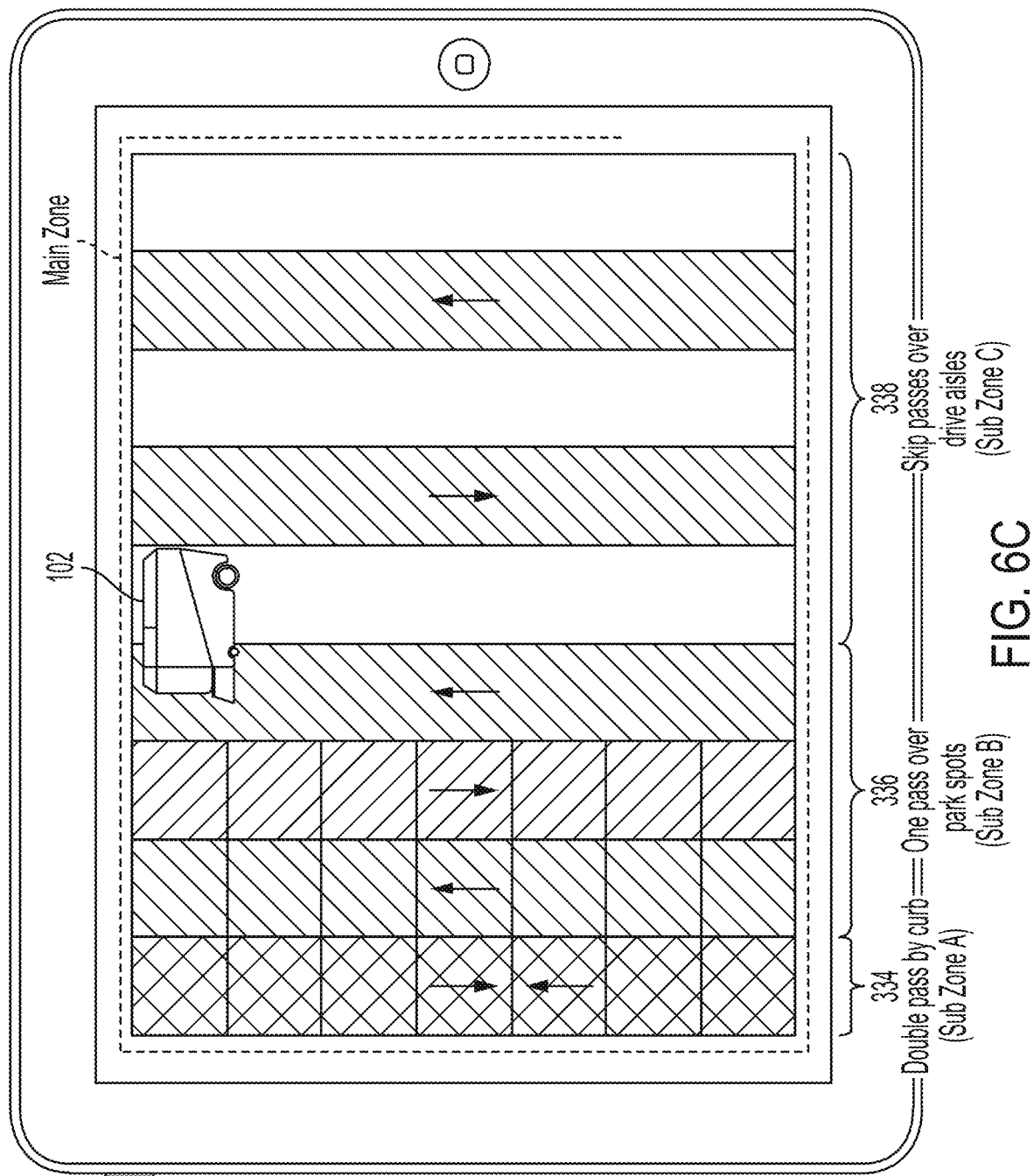
FIG. 6C shows a main zone divided into several subzones, in accordance with one embodiment.

In FIG. 6C, an example is shown where a main zone is divided into several subzones, in accordance with one embodiment. Subzones A 334 is a zone closest to the curb of parking spaces, and this sub zone is programmed to have two sweeping passes in opposite directions. Because it has been observed that the parking spot areas collect more debris than the drive-by aisles, the parking areas are also subdivided to identify a sub zone B 336, where a single pass is processed in a slightly overlapped manner. In the aisle area, a sub zone C 338 is defined, where sweeping is performed with spaces between each of the passes. This sweeping pattern is defined because it is anticipated that very small amounts of debris will be located in the aisle, which reduces the workload necessary to complete sweeping of the main zone of the location. It should be appreciated that the patterns utilized for the work functions will depend on the target location, the type of material or surface being processed, and efficiency predicted for the specific work function.

Figure 7B:
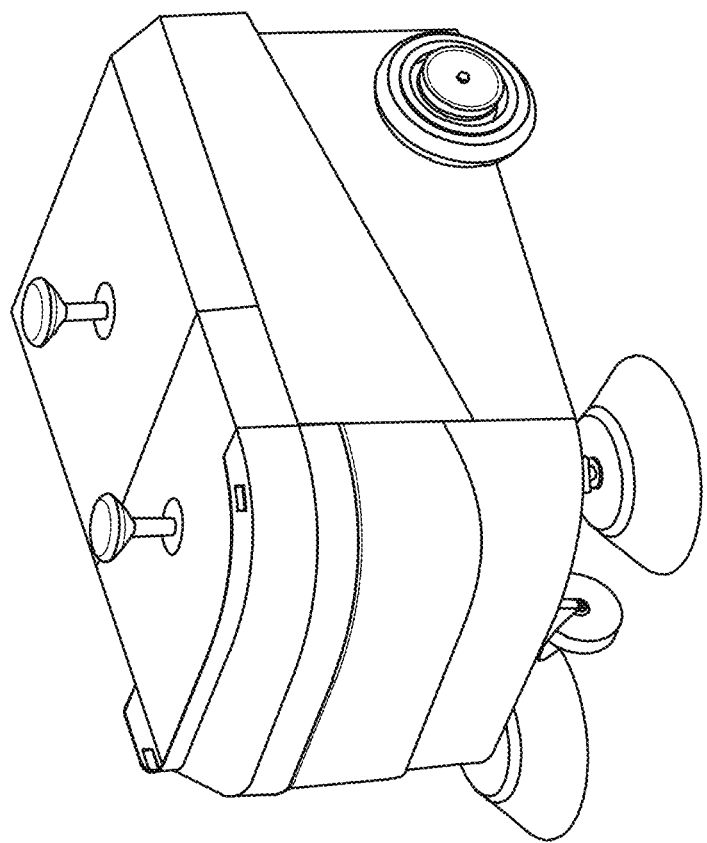
FIGS. 7A and 7B illustrate example perspective views of a modular robot usable for sweeping, in accordance with one embodiment.
Figure 7A:
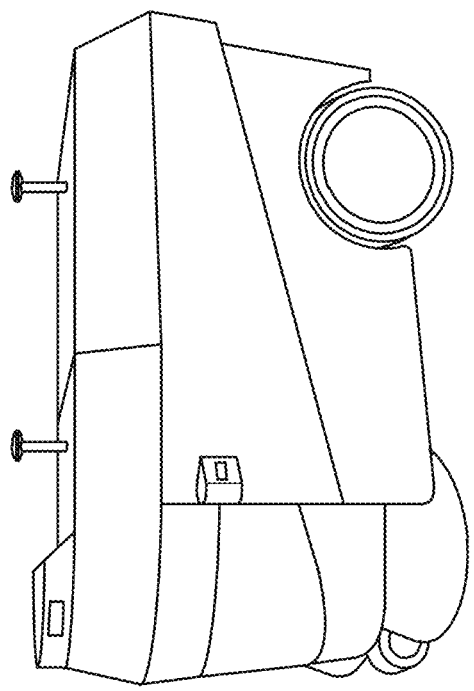

FIGS. 7A and 7B illustrate example perspective views of a modular robot usable for sweeping, in accordance with one embodiment. As shown, the modular robot may include one or more antennas, and can include cameras integrated into the body regions. In some embodiments, the cameras may be integrated to the sides of the outer body of the modular robot to enable a 360 degree view. In one configuration, the top portion of the body may open to expose or grant access to electronics associated with the controller 114, electronics for interfacing with batteries of the sweeper module in the modular robot 102, and other devices. Some electronics related devices may include processors, microcontrollers, system-on-a-chip processors, application specific integrated circuits (ASICs), memory modules, hard drives, solid state drives, network interface cards, radio communication devices, cellular transceivers, associated operating systems, controller boards, lights, plugs, circuit boards, connection wiring, and associated assemblies.

Other devices, without limitation, may include (without limitation) control systems for cameras, depth cameras, radar, LIDAR, motion sensors, depth sensors, ultrasonic sensors, heat sensors, motion sensors, strain sensors, motor sensors, locking sensors, lifting sensors, docking sensors, and other operational or interfacing sensors. In some embodiments, the wheel configuration can be interchanged, depending on the surface the robot is designed autonomously move about. For example, some wheels may be off-road if the vehicle is used on dirt roads or on farms, or harder surface wheels used in parking lots or smooth surface. In other embodiments, instead of wheels, loop rubber tracks can be used for more off-road operation.

Figure 8A:
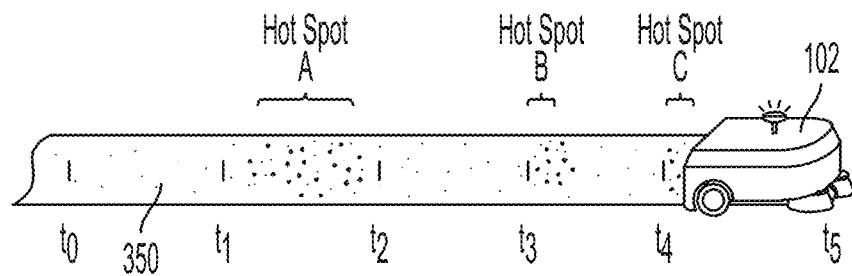
FIG. 8A illustrates an example of a modular robot processing a surface at a location, and traversing along a path, in accordance with one embodiment.

FIG. 8A illustrates an example of a modular robot 102 processing a surface at a location, and traversing along a path 350, in accordance with one embodiment. As shown, an example time line is shown extending from time t0 to time t5. The work function being performed in this example is sweeping. During the process of sweeping a location, the modular robot 102 may detect and identify hot spots A-C. By way of example, the hot spots can be identified using one or more features of the modular robot 102. One feature for detecting hot spots is the use of computer vision. As noted above, computer vision may include, e.g., use of cameras, use of depth sensors, use of ultrasonic sensors, use of LIDAR, use of radar, or a combination of two or more thereof. Computer vision, for example, may detect a change is surface conditions relative to other surface areas. The change in surface conditions may identify different colors, different surface textures, breaks in the surface, changes in reflectivity, etc. The computer vision may also use image recognition to identify surface colors, surface contours, surface materials, etc. In some embodiments, the image data collected by the cameras of the modular robot can use machine learning to identify surface makeup, surface conditions, changes in surface conditions, or potential problems for applying the work function over the surface at a location.

In one embodiment, in addition to using computer vision, the modular robot 102 may also use input from sensors to assist in detecting and/or identifying hot spots. By way of example, the sensors may include one or more inflow sensors that detect volume and/or composition of materials being swept and collected in the container of the modular robot 102. In some embodiments, sensors associated with the container can detected a fullness level, e.g., by use of capacitive sensors. Capacitive sensors include use of one or more metal plates that measure capacitance of the container, wherein the volume/material in the container causes a change in the dielectric constant between the measuring plates.

The result obtained from these sensors can assist in detecting a hot spot, and also identify geolocation coordinates for a region along the path 350 where the hot spot is identified or protected to be present. For instance, if between time t1 and t2 extra debris is detected, the type of the debris is predicted along with the geolocation. The prediction is based on a confidence factor that is increased above a predefined threshold when two or more sensors inputs, e.g., vision, volume, capacitance, inflow rates, fullness, current draw, can point to at least a location where the hot spot is located and/or identification of the type of hot spot.

Figure 8B:
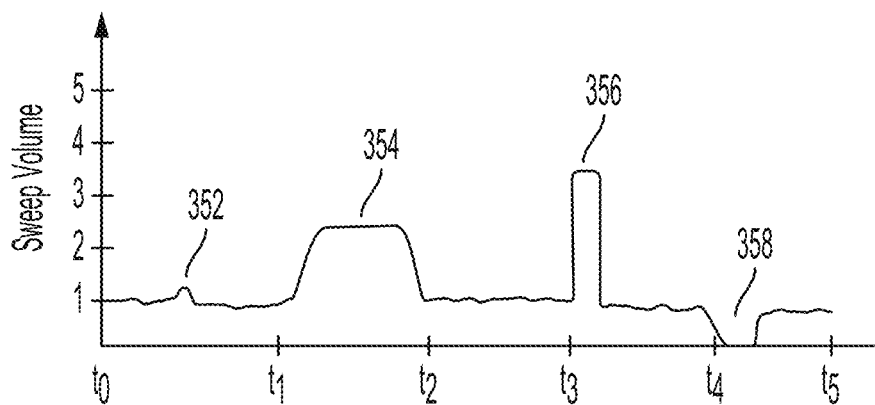
FIG. 8B illustrates a scenario of monitoring volume of sweep, in relation to the example of FIG. 8A, in accordance with one embodiment.
Figure 8C:
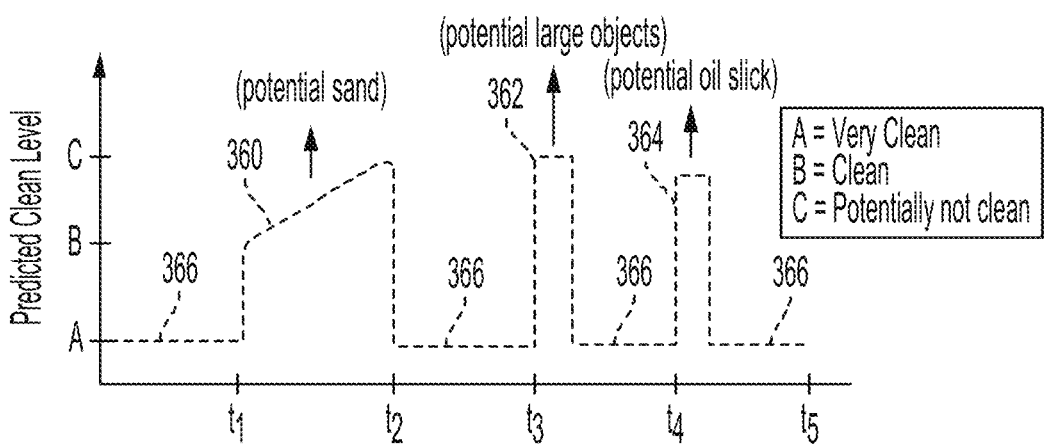
FIG. 8C illustrates a spike indicating potentially not clean during volume increase of FIG. 8B, in accordance with one embodiment.

FIG. 8B illustrates a scenario of monitoring volume of sweep, in relation to the example of FIG. 8A, in accordance with one embodiment. Again, volume is only one indicator that can be used to identify a hot spot or region that may need additional work function application. In the example of volume, it is shown that between time t0 and t1, an increase indicator 352 occurred. The time and magnitude of the increased indicator 352 was short and low, so this might be an indication of regular sweeping and/or collection of an expected item, such as a can, bottle, etc. In FIG. 8C, the predicted clean level is also being calculated using multiple inputs, as discussed above. During the increase indicator 352, it is shown that the predicted clean level is A, e.g., very clean.

However, during time t1 and t2, it is shown that the volume increased from about 1 to about 3 and lasted during the time interval as the modular robot 102 passed along the path 350. During this time frame, the predicted clean level is shown to jump to B, and then gradually up to C in graph 360. In one embodiment, this behavior may be indicative of the sweeper picking up more material at a constant rate. Based on one or more calibration processes and/or machine learning processing, this behavior could be classified as associated with the sweeping of sand. From experience, sand may be present on parking lots and the removal of sand may show similar profile behaviors from the volume measurements, inflow sensors, current draw from sweepers, vision data, etc. Information regarding the potential type of hot spot A may be used by the path programming of the modular robot 102 to automatically program a second pass over the path 350 to cover hot spot A. In some embodiments, a notification can be provided to a user or operator, indicating the potential hot spot A, and recommending a second or more passes to address the hot spot.

In another example, graph 362 of FIG. 8C illustrates a spike indicating potentially not clean during volume increase 356 of FIG. 8B. This spike corresponds to hot spot B, during time t3. In one embodiment, using inputs from various indicators, sensors and learning, it may be predicted that a potential large object was collected or attempted to be collected, e.g., when the work function is sweeping. In graph 364 of FIG. 8C, another spike is shown, indicating potentially not clean at hot spot C. The sweep volume in FIG. 8B does not however show an increase in volume. In this example, the volume actually dips at point 358.

This dip in volume, may be based on the a combination of two or more sensors values, experience, machine learning, and/or prediction, may indicate a type of oil slick. Based on the prediction, the system may generate an automatic recommendation to change work function and return to the geolocation. For example, the module robot 102 may require a different module, e.g., a scrubber and/or detergent, to remove the oil slick. In another embodiment, the hot spot is recorded and provided in a report to the operator or owner of the location in order to obtain approval to perform an additional work function.

It should be appreciated that the various sensors associated with the modular robot 102 can work together to provide data to the servers of a data center where additional processing can be performed. The servers can run real-time tracking of the modular robot 102, its paths 350 traversed at a location, and identify hot spots. The servers can also provide for the processing that enables remote devices gather real time data from modular robots working in the fields, schedules, status, and address recommendations and/or adjustments in work function in a dynamic manner.

Figure 8D:
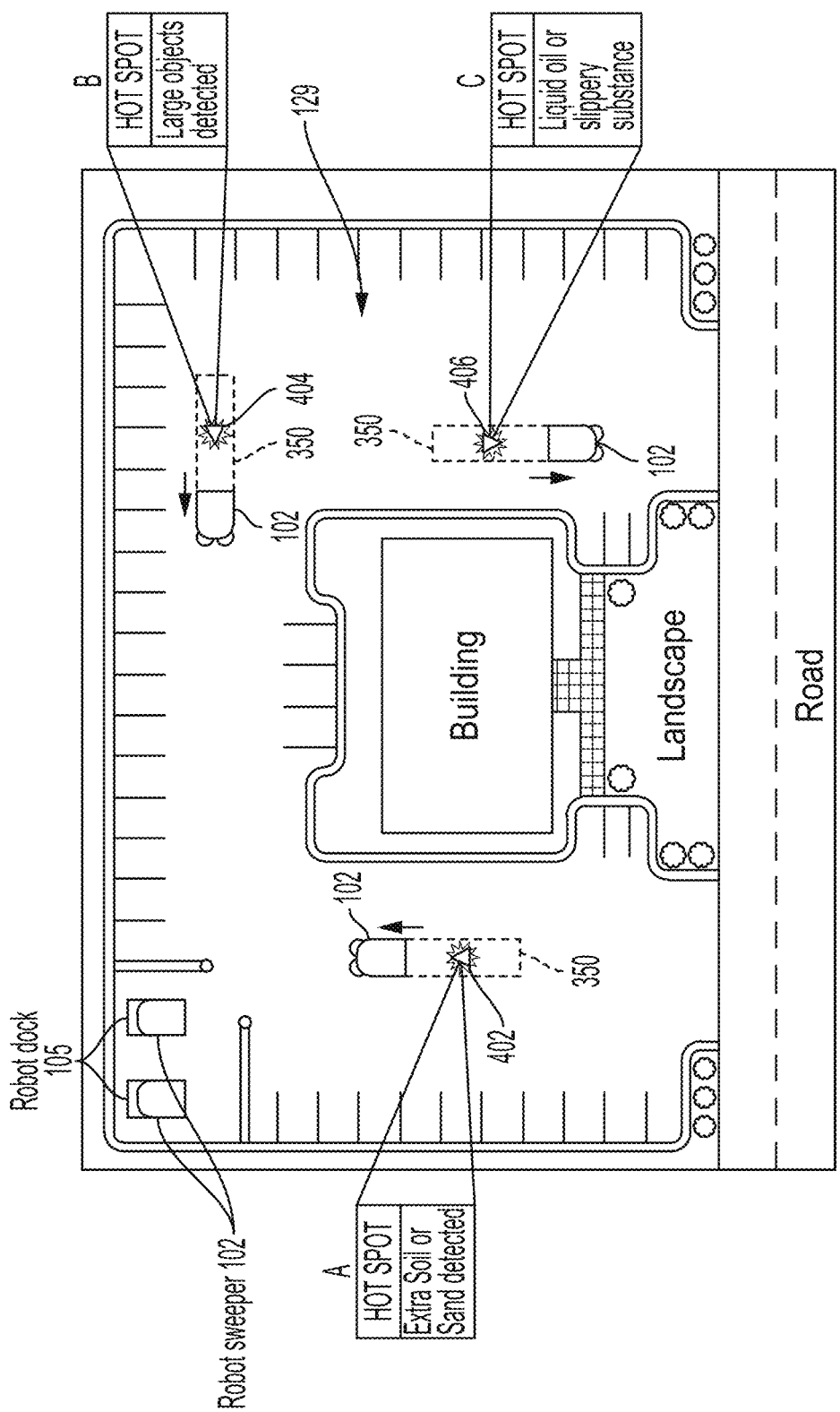
FIG. 8D illustrates an example of a parking lot, where the modular robot is traversing along paths, in accordance with one embodiment.

FIG. 8D illustrates an example of a parking lot, where the modular robot 102 is traversing along paths 350. This illustration shows that the hot spots can be located at different regions at the location 129, and the indicators of the hot spots can be provided as icons or graphical components 402, 404, and 406. In one embodiment, the graphical components can be selected by the user in any suitable user interface to provide additional information regarding the hot spot. The hot spot A, for example indicates that there may be extra soil or sand detected as described above. Hot spot B indicates that there was a potential large object detected.

Hot spot C indicates that a liquid oil or slippery substance was detected. The geolocation coordinates of those hot spots can be identified in the graphical user interface, and saved to a log for providing additional notifications to the user or operator. In some embodiments, logging the information over time will provide historical context of where hot spots are typically occurring. Utilizing this information, it is possible to predict additional work functions required for different areas of a parking lot. These recommendations can be provided in the form of notifications, or through a control panel of a user interface provided to the operator or user of the modular robot 102.

Figure 9:
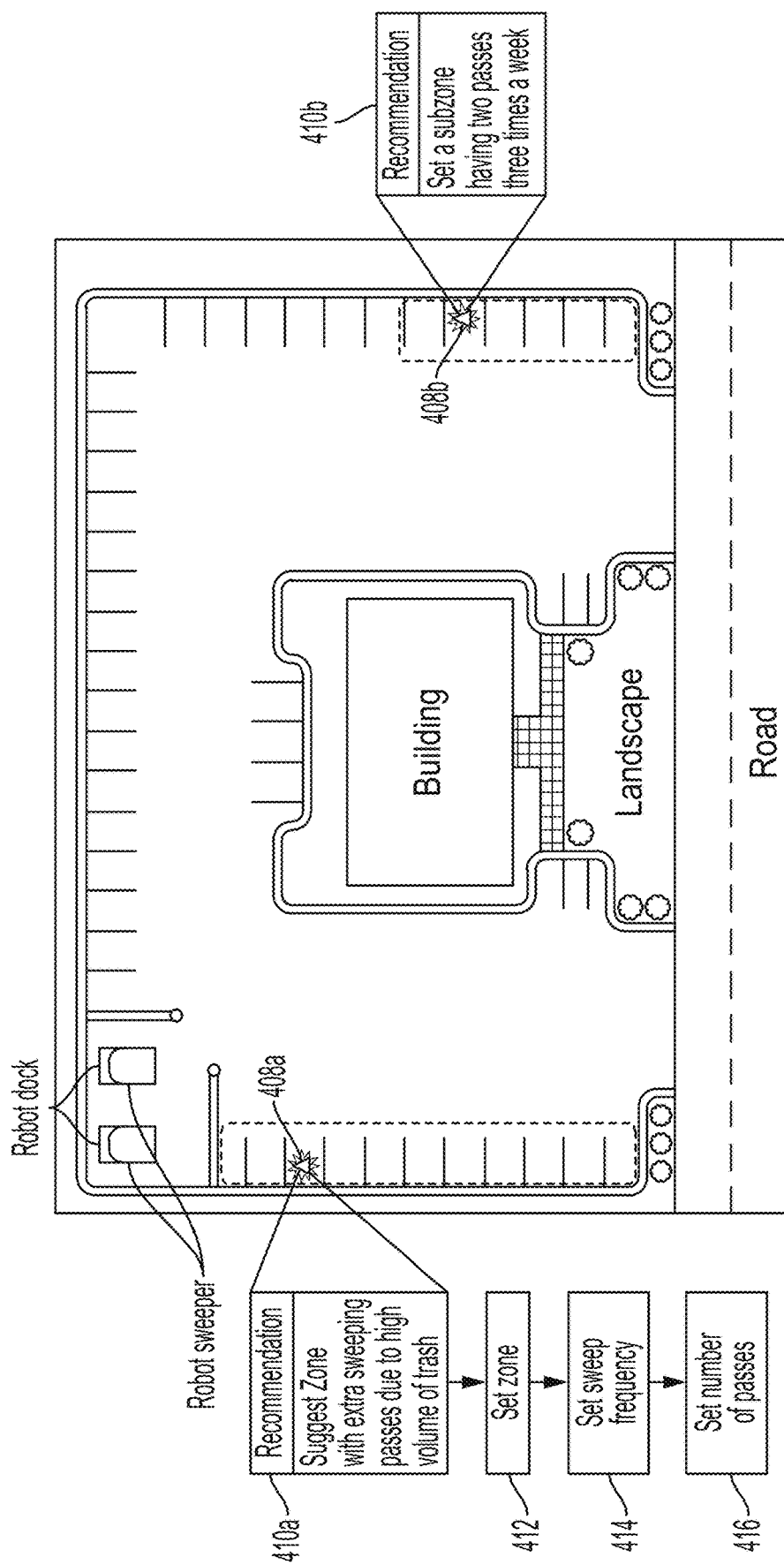
FIG. 9 illustrates another example of a parking lot, where indicators are used to provide recommendations for the parking lot, in accordance with one embodiment.

FIG. 9 illustrates another example of a parking lot, where indicators 408a and 408b are used to provide recommendations for the parking lot. In the example of indicator 408a, a recommendation 410a is provided. The recommendation can identify a sub zone that can be created at the parking lot, based on historical or predicted needs to maintain the parking lot clean. In this example, an outline is created by the system indicating areas in the parking lot that may require an extra sweeping pass due to a high volume of trash being detected over time. In one embodiment, a user can access a user interface to set a zone 412 for the recommendation. A user may also access a user interface to set a sweeping frequency 412 for the zone. In another embodiment would allow the user to set a number of passes 416, for the zone. Operations 412, 414, 416, may be performed at different times or based on the desire of the operator based on the recommendation or based on experience. In the example of recommendation 410b, a user may be recommended to set a sub zone having to passes 3 times a week. Recommendations can include more or less detail, and the recommendations may be tailored for the preferences of the user or operator of the modular robot 102. In one embodiment, preferences can be saved to a user account utilized to access one or more controls, information, settings, operations, notifications, etc., associated with the modular robot 102 and its use at a location.

FIG. 10A illustrates an example of a sweeper robot 102a having a container 502, in accordance with one embodiment. As shown, the sweeper robot 102a is configured to attach to container 502, which is a modular system that can separately be docked, charged and include batteries, and can be transported by the modular robot 102 to perform sweeping work functions. In this example, it is shown that the controller 114 is housed with the modular robot 102, and is interfaced with the electronics 503 of the container 502. The controller 114 is also shown interfaced with sensors 509. Sensors 509 may include one or more sensors distributed throughout the container 502 and or the modular robot 102.

The sensors 509 can be integrated and connected to vision systems, volume detection systems, inflow path detection systems, optical volume detection systems, capacitive volume detection systems, battery control systems, communications systems, and other input output controls and autonomous navigation systems. In some embodiments, one or more of the sensors can be calibrated to detect an amount of sweeping per unit square. The unit square can be, for example, based on the width of the sweeper and a length traversed. The unit square can be, for example, two feet-by-two feet square. In other embodiments, the unit square can be smaller, e.g., one foot by one foot, or smaller, or larger. Sensors 509 described herein are only example types of sensors, and it should be understood that more sensors can be integrated with the container 502 and/or the modular robot 102.

Further shown is a motor 510, which is configured to interface and control brushes 112 to perform the work function of sweeping. As mentioned above, depending on the strain sensed by the brushes 112, the motor 510 may experience in additional or increased current draw. In one embodiment, the increased current draw can be indicative that the container 502 is full or reaching a full state. By way of example, the brushes 112 may begin to touch the surface more than when the modular robot 102 is empty, and the strain can produce the increased current draw that is detected by the controller 114. In one embodiment, capacitive plates 504a and 504b can be integrated in the container 502. The controller 114 can be configured to sense capacitive changes between the plates 504, and then estimate a fullness level based on a change in dielectric constant. In one embodiment, inflow sensors can be mounted near or around the input path 506, which can detect the flow of debris into the container 502. The sensors can include various types of volume sensors, including optical sensors, image sensors, light sensors, volume sensors, mechanical sensors, electrical sensors, or combinations of two or more thereof. As shown, the modular sweeper 102a is configured to move along a path and collect trash 508, which is moved into container 502, as the work functions performed (e.g. a parking lot, garage, or surface is swept).

FIG. 10B illustrates an example flow diagram, of the modular sweeper 102a of FIG. 10A, in accordance with one embodiment. In this example, it is shown the container 502 may include middle plates 504a and 504b, which can be monitored by the controller 114 for changes in capacitance. Changes in a capacitance can be correlated during one or more training calibrations to be indicative of a fullness level of the container 502. Further shown is how trash 508 will be picked up by brushes 112, and move through the input path 506 in its way toward the container 502. The input path 506 can be associated with one or more sensors 509, as described above. The controller 114 can interface with the sensors to detect changes in the flow of debris through the input path 506.

The sensors 509 will produce data that can be used and correlated based on one or more calibration processes to indicate a flow of trash into the container 502, to detect a fullness level, or detect spikes in collection or abnormalities in collection to identify one or more hot spots or recommendations at specific geo-locations of a location. Further shown is how motors 510 are interfaced with brushes 112. As mentioned above, the strain on the brushes 112 when the container is reaching fullness or is full will cause a corresponding current draw on the motors 510. The current draw on the motors 510 can be detected by the controller 114, and can be indicative of fullness or a spike in fullness or a geolocation where the container 502 has picked up more or less debris. In this example, communications device 115 may be integrated with the modular robot 102, and communications device 115 is integrated with controller 114.

Communications device 115 is configured to provide wireless communication with a network 110. The network 110 may be a local network or a combination of local network and remote network, such as the Internet. As mentioned above, the network 110 can interface with a data center where one or more servers provide services for the modular robot 102. The one or more servers can then provide access to one or more remote devices 530. The remote devices 530 may be wireless devices or desktop devices or any type of computer that can access the Internet, and be provided with information or control associated with one or more of the modular robot 102 at one or more sites.

Figure 10C:
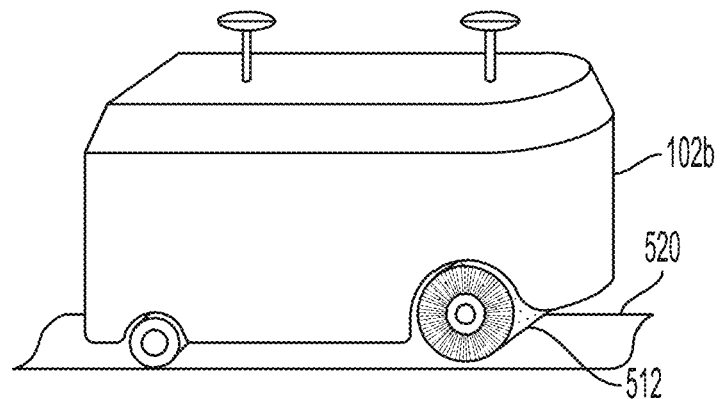
FIG. 10C illustrates an example of a modular scrubber robot, which is configured to include a different type of work function interface, in accordance with one embodiment.

FIG. 10C illustrates an example of a modular scrubber robot 102b, which is configured to include a different type of work function interface, in accordance with one embodiment. The work function interface includes a brush 512. The brush 512 may be designed with stronger bristles that can function to scrub a surface 520 more thoroughly than a sweeper brush that relies on lighter friction and vacuum. In the example of the brush 512, the modular scrubber robot 102b can be defined from metal bristles, or stiffer plastic bristles, or combinations of metal bristles and plastic bristles, or compositions of materials suitable for the target surface to be cleaned and the material to be targeted with the work function.

Figure 10D:
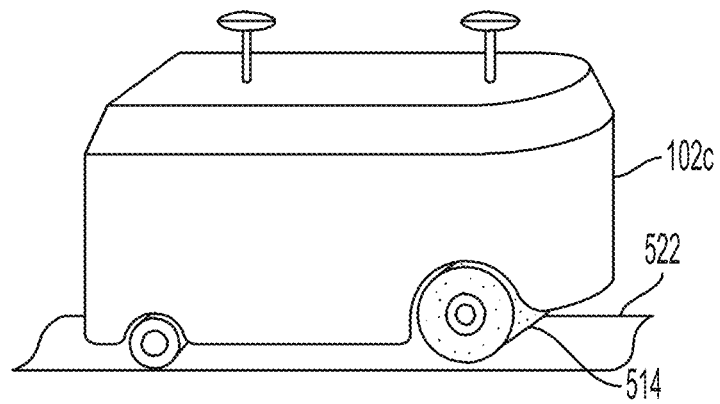
FIG. 10D illustrates an example of a modular buffer robot, which is configured to include a different type of work function interface in accordance with one embodiment.

FIG. 10D illustrates an example of a modular buffer robot 102c, which is configured to include a different type of work function interface in accordance with one embodiment. The work function interface is a buffing pad 514. The buffing pad may be defined from a material that is suitable for buffing the type of surface selected for the work function. For instance, if the surface 522 is a hardwood floor, the buffing pad may include softer polyvinyl alcohol type brushes, rubber brushes, cloth brushes, polyester threads, or the like. It should be understood that the modular unit that includes the buffing pad 514 may also be interchanged with other types of modular units. That is, the modular robot 102 can connect with many types of modular units, and utilize its autonomous control to move the modular units to perform the work function at the desired site or location.

Figure 10E:
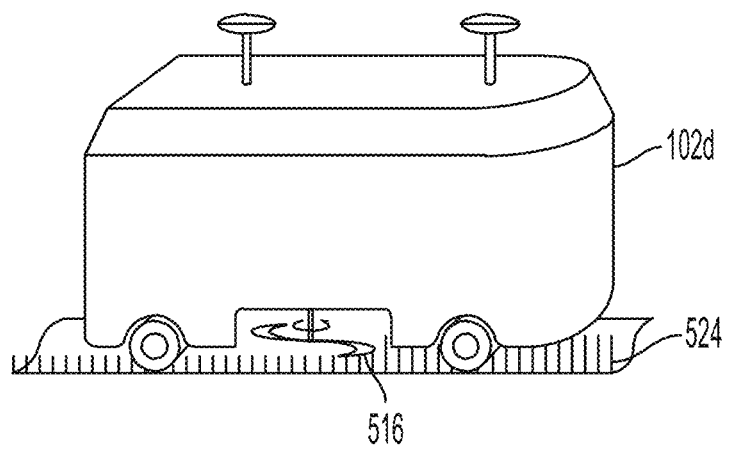
FIG. 10E illustrates an example of a modular mower robot, which is configured to include a different type of work function interface in accordance with one embodiment.

FIG. 10E illustrates an example of a modular mower robot 102d, which is configured to include a different type of work function interface in accordance with one embodiment. The work function interface is a mowing blade 516. The mowing blade 516 can be configured to mechanically move up and down to make adjustments on the amount of mowing to be performed over a grass surface 524. As shown, the modular mower robot 102D can be controlled at a location to perform the mowing functions, as desired based on control of one or more servers for specific geo-locations that are mapped. As mentioned above, the mapping data produced and calibrated for parking lots can also be utilized for mapping grass fields or other surfaces to be worked.

Figure 11A:
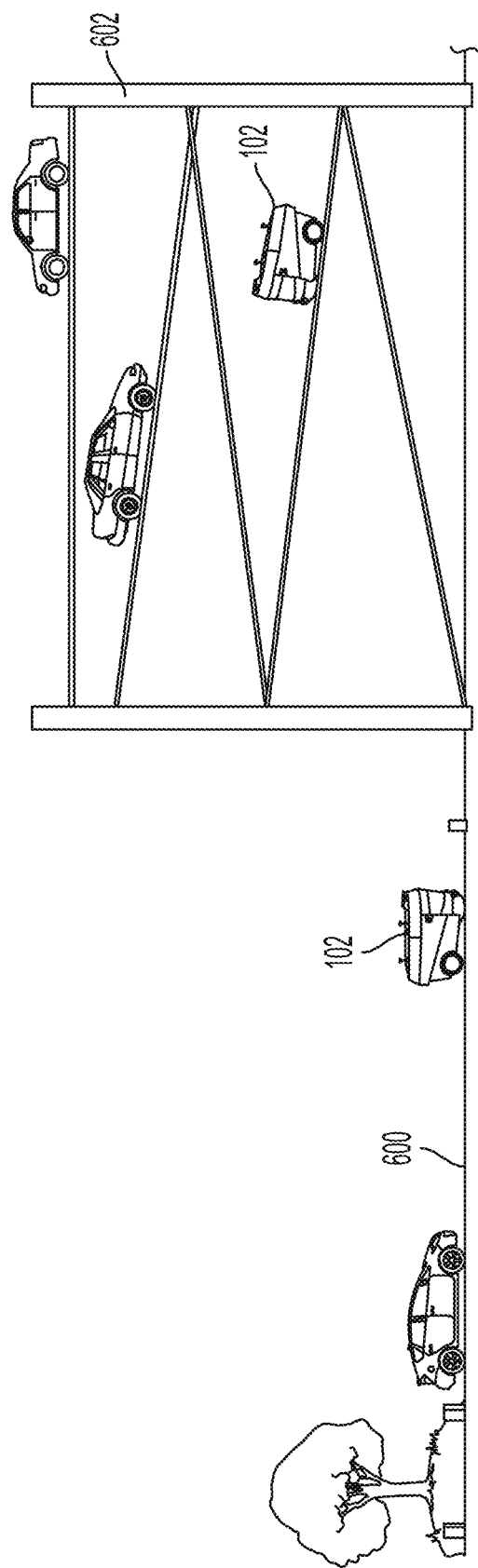
FIG. 11A illustrates an example of a vehicle parked over a parking lot, and vehicles parked in a parking garage, in accordance with one embodiment.

FIG. 11A illustrates an example of a vehicle parked over a parking lot 600, and vehicles parked in a parking garage 602. In modular robot 102 can function to sweep the parking lot 600, and also sweep a parking garage 602. When the surface to be swept is a parking garage 602, it is possible to utilize indoor GPS, and perform the calibration of the mapping data to the indoor GPS. In this manner, the modular robot 102 can perform accurate zoning in different regions of the parking garage 602, just as done in a parking lot 600.

Figure 11B:
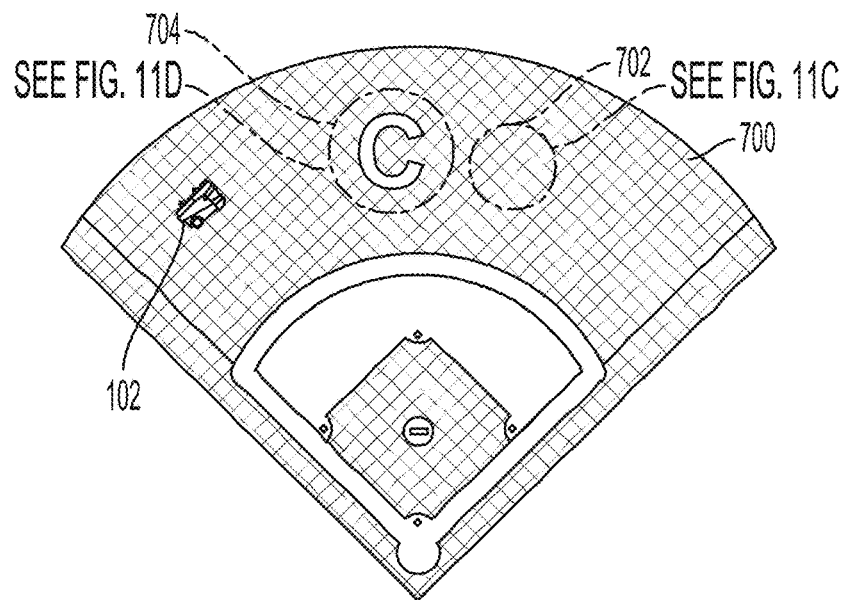
FIG. 11B illustrates an example of a baseball diamond, where the modular robot can traverse to perform mowing functions, in accordance with one embodiment.
Figure 11C:
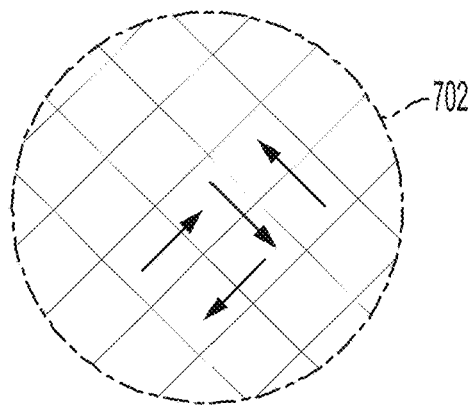
FIGS. 11C and 11D illustrate example details from FIG. 11B, in accordance with one embodiment.

FIG. 11B illustrates an example of a baseball diamond 700, where the modular robot 102 can traverse to perform mowing functions, in accordance with one embodiment. In this embodiment, the baseball diamond 700 can be mapped to create calibrated mapping data in a similar manner as described above, as done for parking lots. Once the mapping data has been generated and calibrated for the baseball diamond 700, a pattern can be defined for traversing the surface to be worked. As shown in FIG. 11C, the pattern to be used for mowing the grass of the baseball diamond 700 is a cross pattern. The cross pattern may be desired by the baseball diamond operator, to produce a shading of the baseball diamond in the outfield, or infield. The modular robot 102, once programmed, can perform the mowing function in an autonomous manner, and perform those functions either the same or differently in different zones.

Figure 11D:
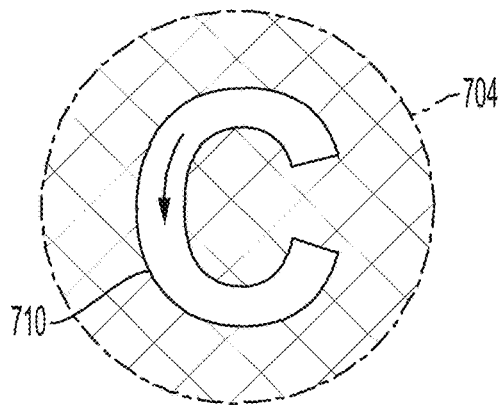

In one embodiment, the zone 702 may include the cross pattern, while the zone 704 may include a logo pattern, as shown in FIG. 11D. The logo pattern may be the logo of the baseball team that utilizes the modular robot 102 for mowing functions. The logo can be associated with geolocation coordinates, such that mowing throughout the baseball season will allow for the logo to be placed in approximately the same location, e.g. within inches. In some embodiments, some logos will require more intense mowing and/or selection of different mowing modules to provide fine tune mowing for defining the logo pattern. In these embodiments, different paths can be associated with different zones program for generating the logo over the field. Mowing logo patterns in the field is a meticulous process when done manually. However, the modular robot 102 can be controlled using precise geolocation mapping and perform different types of functions in different zones in an accurate manner that is repeatable. This avoids for the labor-intensive processing done typically in baseball diamonds or other sporting type fields that require specific mowing patterns, zones, logos, and/or sweeping.

Figure 12A:
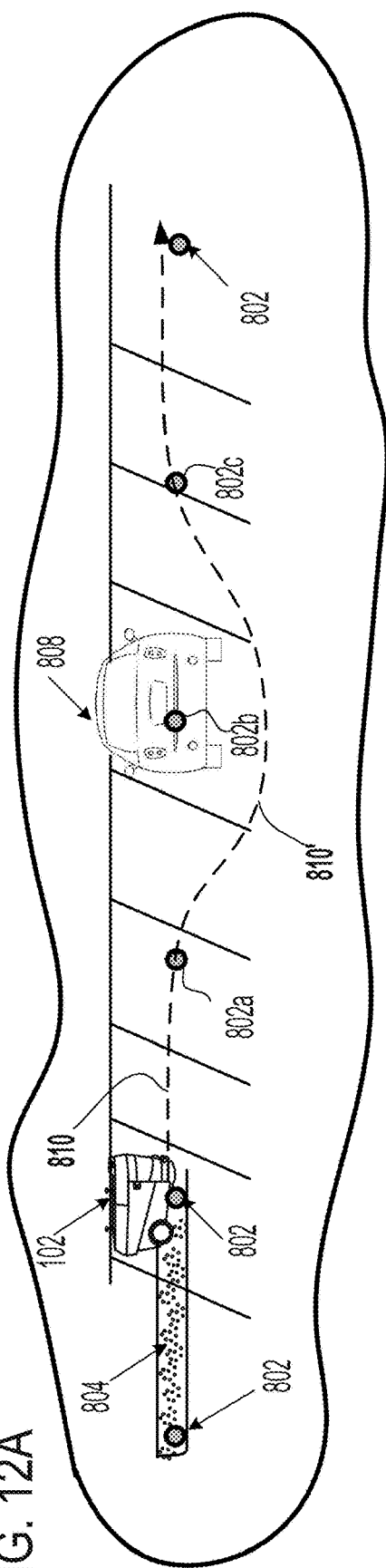
FIGS. 12A and 12B illustrate an example of waypoints and the use of waypoints and settings thereof to optimize the path of the modular robot at a location when performing a work function, in accordance with one embodiment.
Figure 12B:
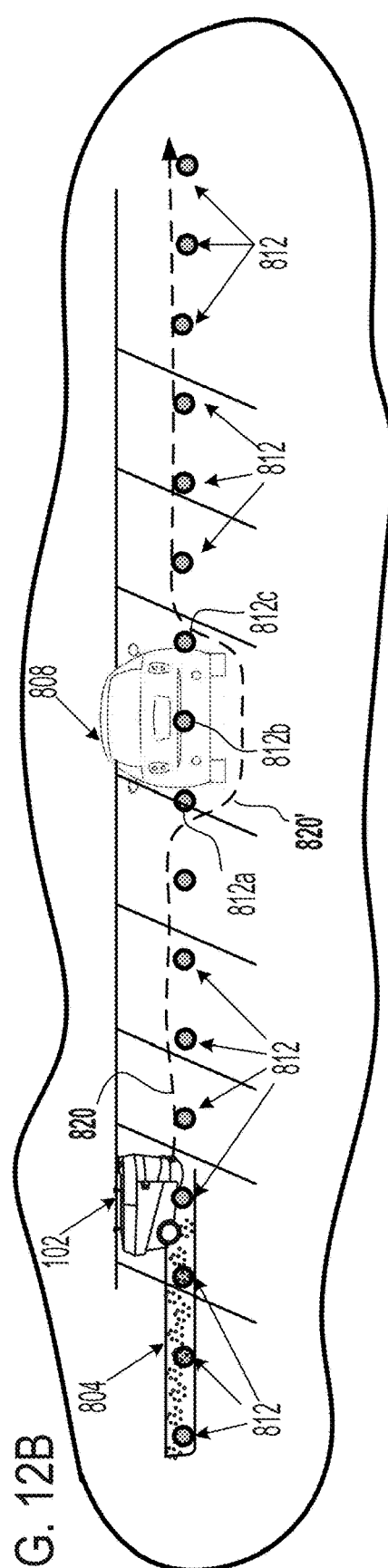

FIGS. 12A and 12B illustrate another embodiment for implementing waypoint spacing, in accordance with one embodiment. As shown, FIG. 12A, illustrates a modular robot 102 traversing along a path 810 by following waypoints 802, which are defined by the traverse pattern established for a zone. In this example, modular robot 102 is a sweeper robot, which is configured and programmed to sweep a parking lot that includes parking spaces. Sometimes the parking spaces are occupied by vehicles, such as vehicle 808. The robot is programmed to traverse a path that is defined by geo-locations that are referred to as waypoints. The waypoints defined the path through which the robot 102 is to progress during the sweeping of the parking lot. As mentioned above, modular robot 102 includes sensors that enable detection of objects, which may be permanent objects, semi-permanent objects, or temporary objects.

The temporary objects may be vehicles, such as vehicle 808. As illustrated, the modular robot 102 will progress following waypoints 802. The modular robot 102 will approach waypoint 802a, and as the modular robot 102 notices vehicle 808, it determines that it cannot safely approach waypoint 802b. In this situation, the modular robot 102 will modify its path along path 810', in order to avoid vehicle 808. As the modular robot 102 diverts along a path around the vehicle 808, the modular robot 102 will seek to regain following waypoint 802a, and then waypoint 802 (e.g., continuing along the path 810 that was programmed for the zone that is being swept). In one embodiment, it is noticed that spacing the waypoints 802 too far apart, may cause the modular robot 102 to divert along the path 810' that is too far around the vehicle 108, leaving surface area that is not properly swept.

By way of example, if the waypoints 802 are separated by about four meters apart, it is noticed that the diversion around the vehicle 808 leaves a wider area on swept, and may require one or more passes to complete the cleaning or sweeping at a future time. As mentioned above, it is possible to identify those areas where an obstacle was detected and diversion around the obstacle was necessary to complete the sweeping.

In FIG. 12B, the waypoints 812 are designed to be spaced apart more closely than the example of FIG. 12A. In one embodiment, the spacing may be reduced to between 25 centimeters and about 150 cm, and in some embodiments may be reduced to between about 50 cm and 125 cm, and in some examples may be spaced apart to about 1 meter (100 cm). The reduced spacing of the waypoints 112 is shown to allow the modular robot 102 to make finer turns to avoid obstacles, and allow for more precise sweeping of the parking lot around obstacles they are temporary, semi-permanent, or even permanent.

As shown, when the modular robot 102 moves along path 820, the modular robot reaches waypoint 812a and then begins to turn to avoid collision with the vehicle 808 along path 820'. The modular robot 102 cannot reach waypoint 112b, since the vehicle 108 is parked over the waypoint 112b. However, following path 820', the modular robot 102 can approach or get close to following waypoint 112c before continuing along following waypoints 812 along the path 820. As used herein, waypoints can be identified by GPS coordinates, which are used to define the paths that the modular robot 102 will traverse during its work function at a location. Adding waypoints, enables for more precise avoidance of obstacles recognized as permanent/semi-permanent during operation. Further, setting spacing between waypoints to account for obstacles not (yet) recognized as permanent, enables for advanced programming of the separation distances between the waypoints that are efficient for the specific environment.

The waypoint spacing can vary to set optimal separation distances based on the target surface to be processed. By way of example, it may be possible to have waypoints spaced further apart in open areas, such as large parking lots, but modified the distance to be less for tighter areas such as parking garages, indoor facilities, or locations that have multiple obstacles or obstacles that may be present and detected during operation. Therefore, the above described measurements of distance and narrowing of measurements distances in FIGS. 12A and 12B are only by way of example.

Accordingly, the setting of distances can be done in software, and implemented by the mapping of the location, and path following performed by the modular robot when following the waypoints. Thus, setting the distance between the robot's traversal waypoints smaller/larger is a modifiable parameter for efficiently traverse around static obstacles, e.g., modifying these waypoint positions for obstacles recognized as static and semi-permanent.

Though in implementations of the disclosure described above, a modular robot 102 has been discussed, it will be appreciated that in other implementations, other types of modules having different functions can be attached to the robot. For example, a lift mechanism of the robot can be used to attach and retain interchangeable modules/attachments for performing different work functions. The interchangeable attachments may each be configured to perform a unique task, e.g., steam cleaning, vacuuming, grass cutting, polishing, buffing, driveway and/or street cleaning (e.g., sweeping), package grasping and/or moving, etc. In some embodiments, the interchangeable attachments may be configured to perform complementary tasks. For example, for cleaning a floor, the first interchangeable attachment may be configured to vacuum the floor and the second interchangeable attachment may be configured to steam clean the floor.

In some implementations, the interchangeable attachments may be automatically loaded and unloaded from the robot one or more dock assemblies (or docking stations or base stations). The loading and unloading may be performed autonomously, with the robot automatically aligning itself and loading or unloading an interchangeable attachment as needed to accomplish the job assignment that the robot has been programmed to perform.

In some embodiments, the vertical movement of attachments achieved via a lift mechanism of the robot may be utilized as part of performing a task and/or to accommodate interchangeable attachments of different sizes. For example, in the case of a sweeper module the lift mechanism can be utilized to lift the sweeper module to a height required to remove the sweeper module from the dock assembly. The lift mechanism can also be used to lower the sweeper module to the appropriate height for carrying out sweeper operations, such as a height at which the brushes of the sweeper module fully contact the floor.

In some implementations, the robot includes a controller that is configured to control the autonomous functions of the robot. For example, the controller can control the motors which effect movement of the wheels of the robot to move the robot in its operations, such as to control movement of the robot over the sweeper module, and move autonomously along a path to capture debris into the container of the sweeper module. Further, the controller can control the robot's lift mechanism to lower the lift frame over the sweeper module to connect the alignment pegs with the alignment holes, control the locking mechanism to secure the lift frame to the sweeper module, and control the lift mechanism to raise the lift frame along with the sweeper module toward the interior space of the robot. It will be appreciated that the controller may control these operations in reverse so as to lower the lift frame along with the sweeper module, to seat the sweeper module onto the alignment platform, unlock the sweeper module so as to release the sweeper module, control the lift mechanism to raise the lift frame without the sweeper module, and move the robot off of the dock assembly while leaving the sweeper module at the dock assembly, for example, to allow the sweeper module to charge its battery or be serviced otherwise.

It will be appreciated that in some implementations, the robot includes a battery for powering its motors, lift mechanism, sensory systems, and other electronic systems. The sweeper module can also include a battery for powering the sweeper module, such as powering rotation of its brushes. In some implementations, a battery controller handles sharing of power between the robot's battery and the sweeper module's battery. The battery controller can be implemented as part of the robot or the sweeper module, or partially implemented on both the robot and the sweeper. In some implementations, power from the sweeper module's battery can be shared to the robot to, for example, charge the robot's battery, power the robot's motors, lift mechanism, locking mechanism, sensors, communications, etc. Likewise, in some implementations, power from the robot's battery can be shared to the sweeper module to, for example, charge the sweeper module's battery, power the sweeper module's brushes, etc.

In some implementations, the battery of the sweeper module is significantly larger than the battery of the robot, as the sweeper module is retained at the docking station and subject to charging for greater periods of time. Hence, the battery of the sweeper module can be implemented as the primary power source for the sweeper module as well as the robot, and therefore used to power the functions of both units.

In some implementations, when the sweeper module is connected to a docking station, and the robot is connected to the sweeper module, then the battery controller can route power to effects charging of one or both of the sweeper module's battery and the robot's battery. It will be appreciated that the battery controller routes power received from the docking station through the sweeper module to the robot, in order to provide power to the robot to charge its battery.

In some implementations, the robot includes a plurality of cameras and a global positioning system (GPS) for controlling movement of the robot by the controller. In some implementations, the robot uses one or more cameras to align with a visible code located at the dock system as described above, and images of the visible code are processed by the controller for guiding the robot to align with the dock system when the robot approaches the dock system for pickup or release of the sweeper module.

Advantageously, robots according to various embodiments disclosed herein may run indefinitely, with the robot constantly swapping batteries and interchangeable attachments as the need arises and as job assignments change. As a result, the robot may function as a home cleaning robot, a commercial cleaning robot, an outdoor robot, an indoor robot, etc. which may autonomously change its abilities without the need of human interaction (e.g., from grass cutting with a grass cutting attachment, to moving bins and crates of an adapter for supporting bins and crates, to cleaning driveways with a vacuum and/or sweeping attachment). An example of the operation of the robot is provided below. It will be appreciated that the sequence below may be performed in the order shown. In addition, omissions of certain actions and/or changes in the order of various actions are also contemplated.

1. The robot may start off at a charging base station with an interchangeable attachment (e.g., a sweeper module) locked to the main chassis or body of the robot through its retention system.
2. The robot may start off with a power supply (e.g., a removable battery) already in place.
3. The robot heads out of the charging base to perform its assignment (in this case sweeping).
4. When the robot is finished with the assignment (finished sweeping a given area), or when the interchangeable attachment is filled to capacity (e.g., when a sweeper module is filled with debris) the robot will return to the base station or another designated drop area, and detach the interchangeable attachment. The detachment may occur via unlock and pushout of the attachment, or by dropping the attachment under the force of gravity.
5. The robot aligns itself to the interchangeable attachment, or wherever the retention adapters are among the interchangeable attachments, moves towards the interchangeable attachment, centers itself (e.g., using sensors such as a camera) and the retention system locks/unlocks the interchangeable attachment as desired. When the robot approaches the base/charging station, at a certain distance it starts a docking procedure. The robot maintains a docking distance from the base station to help itself align to the back of the modular box as well as to the retention system before the robot docks.
6. This docking procedure exists in both retaining and detaching the interchangeable attachments at a designated area or a base/charging station.
7. The base station may help guide the robot via sensors and buttons to dock at the base station and aligned with the retention system. In other words, the base station may provide guidance for the robot to return to the station. In addition, the station may include an actuator that shifts the position of the interchangeable attachment to align with the retention system of the robot.
8. The robot may move towards and locate the base station with a variety of sensors, such as live feed cameras, infrared or other proximity sensors, ground sensors, or line detection sensors that are able to follow "tracks" which may be provided on the ground along the path which the robot is to traverse. The tracks may be, e.g., anything from tape that is sensed by the robot, paint sensors disposed or integrated into a surface, or sensors embedded at specific locations in the ground. The use of tracks in one embodiment is optional, since the robot will be able to use its cameras and sensors to navigate and avoid obstacles.
9. The robot may use a variety of sensors such as live feed cameras and/or infrared or other proximity sensors to help locate, and load and unload the interchangeable attachments at a base station or other designated area.
10. The robot may move to an empty location (e.g., at the base station or at a designated area) and detach its interchangeable attachment. Preferably, this detachment occurs at the location the interchangeable attachment was originally picked up from, e.g., at the space left open when the component was earlier retained by the robot.
11. The robot may then move to another interchangeable attachment for another task. For example, the robot may align itself with a steam cleaning interchangeable attachment located at the base station (e.g., next to or around the vacuum interchangeable attachment), and pick up the steam cleaning interchangeable attachment via the retention system, and then move away from base station to perform the steam cleaning task. In some other embodiments, both the vacuum attachment and the steam cleaning attachment may be loaded onto the robot such that vacuuming and steam cleaning maybe performed without requiring the robot to return to the base station to switch attachments.
12. The robot can navigate with the help of GPS, in addition to other location devices not positioned on the robot itself or the base station to help with returning to an interchangeable attachment for docking and undocking. These are location devices may include Bluetooth beacons or infrared light emitters.
13. In cases where the robot is equipped with a modular, removable power supply, the power supply may be unloaded and a new power supply may be loaded in a procedure similar to the unloading and loading of interchangeable attachments. For example, where the robot has performed various tasks and its attached battery is running low, the robot may: move to a base station containing a charged or charging battery, unload a depleted battery at the base station or designated area, and load another battery.
14. In cases where the robot is not equipped with a modular, removable power supply, the robot may use a variety of sensors to return to the base station for recharging. The robot may return to the base station to recharge, head off to finish its job, or remain at the base station depending on whether a job assignment has been completed.
15. The robot may be charged while retaining an interchangeable attachment. For example, such charging may be performed via connectors built into the robot that send signals and power to both the interchangeable attachments and the robot's main computer system. In some embodiments, charging may occur without the robot retaining any interchangeable attachment.
16. It will be appreciated that the interchangeable attachment may be tracked by the robot using shape/color or design. Such tracking may be utilized to align to the robot for unloading and loading the interchangeable attachment.

It will be appreciated by those skilled in the art that various omissions, additions and modifications can be made to the processes and structures described above without departing from the scope of the invention. For example, it will be appreciated that the robot has been shown without any side panels or other housing around the functional illustrated components. In some embodiments, a housing or shell may be provided around the illustrated components e.g., to protect these functional components from collisions of external objects, weather, or other external phenomena that may damage these functional components.

In addition, the housing may maintain a consistent external appearance and size/shape to the robot, irrespective of the sizes of the interchangeable attachments or the number of retained attachments. This may provide aesthetic benefits and/or allow a consistent interface with other devices external to the robot (e.g., a base station) irrespective of modifications to the internal components or interchangeable attachments. In addition, while various components have been illustrated and discussed as being placed at different locations, it will be appreciated that the relative locations of the various compliments may be varied while still maintaining the functionality disclosed herein.

It is contemplated also that various combinations or sub-combinations of the specific features and aspects of the embodiments may be made and still fall within the scope of the description. Various features and aspects of the disclosed embodiments can be combined with, or substituted for, one another in order.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for operating a modular robot, comprising,
receiving, by a server, communications data from a controller of the modular robot, the modular robot having storage for storing program instructions for executing autonomous movement at a location;
sending to the controller, by the server, an initial outline for the location generated by the server using arial image data, the initial outline is validated by the controller to generate calibrated mapping data identifying an outline at the location;
sending, by the server, identification of at least two zones at the location, the at least two zones defining different areas at the location; and
sending, by the server, a work function to be performed by the modular robot for each of the at least two zones, the work function in each of the at least two zones set to be different at said server;
wherein the controller of the modular robot is configured to use the calibrated mapping data for said autonomous movement at the location and the controller is configured to operate said respective work function in each of the at least two zones.

2. The method of claim 1, further comprising,
sending, by the server, a pattern of traverse used by the modular robot for said autonomous movement in each of the at least two zones, wherein the pattern of traverse is a same pattern or different pattern in each of the at least two zones.

3. The method of claim 1, wherein the modular robot includes a plurality of cameras for providing computer vision and a global positioning system (GPS),
wherein the controller is configured to use information from the plurality of cameras and the GPS for controlling said autonomous movement of the module robot, the computer vision being used to avoid obstacles detected at the location and identify characteristics of a surface at the location.

4. The method of claim 1, wherein the server provides access to a user interface that is accessible by a remote device over the internet, the user interface provides data regarding the location and controls for entering input for,
setting the calibrated mapping data for the location;
setting the identification of the at least two zones at the location; and
setting the work function to be performed in each of the at least two zones at the location.

5. The method of claim 4, wherein the user interface further includes controls for setting a pattern of traverse to be used in one or both of the at least two zones of the location.

6. The method of claim 1, further comprising,
receiving, by the server, a current draw detected from one or more motors used to drive brushes used by the modular robot for sweeping debris, the current draw being indicative of a fullness level of a container of the modular robot or a hot spot at the location, said hot spot is indicative of an increase or decrease in debris encountered at one or more GPS coordinates in one or more of said two or more zones at the location.

7. The method of claim 6, wherein the controller is configured to record said hot spot and other hot spots at the location and transit to said server, said hot spots are associated with a description of the hot spot, the hot spots being used to define an additional work function for addressing the hot spots.

8. The method of claim 1, wherein the controller is interfaced with one or more sensors to detect a condition of the modular robot.

9. The method of claim 1, wherein the modular robot is configured to interface with a sweeper module used for sweeping debris at the location, the method further includes,
receiving, by the server, sensor data from a communications device of the modular robot, the sensor data is configured to identify a volume of said debris passing into a container of the sweeper module, the sensor data is associated with global positioning system (GPS) coordinate data at the location, the sensor data is usable to identify regions in the location that have increased or decreased amounts of said debris, and further using said sensor data to generate one or more additional zones at the location or update the work function for said regions.

10. The method of claim 1, wherein the modular robot is associated with a communications device that interfaces with said controller, the communications device is configured receive instructions from the server and send data collected at said location during operation, the data collected includes one or more of,
identification of a hot spot, identification of a region that has an increased amount of debris, an identification of vehicles parked and blocking part of the surface at the location, identification of obstacles avoided at the location, a progress associated with completing the work function at the location, an error report from the modular robot, a fault from the sweeper module, an increase in current draw from the sweeper module, an increase in debris collected at specific geolocations, camera data collected at the location, or a combination of two or more thereof.

11. The method of claim 1, further comprising,
receiving, by the server, updates from the modular robot, the updates include information regarding a type of module being handled by the modular robot, wherein the type of module is one of a sweeper with brushes, or a scrubber with scrub brushes, or a vacuum with suction, or a mower for cutting grass or brush, or a polisher with a pad for polishing a surface, or a washer for washing a surface;
wherein the server provides access to a user interface that is accessible by a remote device over the internet, the user interface provides data regarding the location and controls for entering input settings for directing operation of the modular robot, or directing timing schedules of the modular robot, or receiving notifications from the modular robot, or receiving logs indicative of hot spots from the modular robot, or receiving alerts of accidents at the location from the modular robot, or receiving GPS coordinates of hot spots at the location from the modular robot, or receiving battery levels of the modular robot or module being handled by the modular robot, or a combination of two or more thereof.

12. The method of claim 1 wherein the controller is configured to determine an adjustment to performance of a work function, the adjustment changes how the work function is performed to increase efficiency or minimize failure.

13. The method of claim 12, wherein the adjustment is usable by the controller to set or change a direction of movement by the modular robot to reduce turns or avoid surface obstacles or reduce speed in specific geolocations of the location.

14. The method of claim 1, wherein the modular robot is configured to move along a path defined by waypoints at the location.

15. The method of claim 14, wherein one or more additional waypoints are added to a total of the waypoints along the path, and a separation between the waypoints is reduced for the location to reduce diversion from the path when avoiding an obstacle detected at the location.

16. A method for operating a modular robot, comprising,
receiving, by a controller of the modular robot, communications data from a server, the modular robot having storage for storing program instructions for executing autonomous movement at a location;
receiving from the server, by the controller, an initial outline generated using areal image data for the location, the initial outline is validated by the controller to generate calibration mapping data used to define calibrated mapping data to outline the location;
receiving, by the controller, assignment of at least two zones at the location, the at least two zones defining different areas at the location; and
receiving, by the controller, a work function to be performed by the modular robot for each of the at least two zones, the work function in each of the at least two zones is defined to be different as identified by said server;
wherein the controller of the modular robot is configured to use the calibrated mapping data for said autonomous movement at the location and the controller is configured to operate said respective work function in each of the at least two zones.

17. The method of claim 16, further comprising,
receiving, by the controller, a pattern of traverse at said location for said autonomous movement in each of the at least two zones, wherein the pattern of traverse is a same pattern or different pattern in each of the at least two zones.

18. The method of claim 16, wherein the modular robot includes a plurality of cameras for providing computer vision and a global positioning system (GPS),
wherein the controller is configured to use information from the plurality of cameras and the GPS for controlling said autonomous movement of the module robot, the computer vision being used to avoid obstacles detected at the location and identify characteristics of a surface at the location.

19. The method of claim 16, wherein the server provides access to a user interface that is accessible by a remote device over the internet, the user interface provides data regarding the location and controls for entering input, the controller is configured to receive instructions from said server to,
set the calibrated mapping data for the location;
set the identification of the at least two zones at the location; and
set the work function to be performed in each of the at least two zones at the location.

20. The method of claim 19, wherein the user interface further includes controls for setting a pattern of traverse to be used in one or both of the at least two zones of the location.

21. The method of claim 16, further comprising,
sending, by the controller, data to the server regarding a current draw detected from one or more motors used to drive brushes used by the modular robot for sweeping debris, the current draw being indicative of a fullness level of a container of the modular robot or a hot spot at the location, said hot spot is indicative of an increase or decrease in debris encountered at one or more GPS coordinates in one or more of said two or more zones at the location.

22. The method of claim 21, wherein the controller is configured to record said hot spot and other hot spots at the location and transit to said server, said hot spots are associated with a description of the hot spot, the hot spots being used to define an additional work function for addressing the hot spots.

23. The method of claim 16, wherein the controller is configured to determine an adjustment to performance of a work function, the adjustment to the work function is to increase efficiency or minimize failure.

24. The method of claim 23, wherein the adjustment is usable by the controller to set or change a direction of movement by the modular robot to reduce turns or avoid surface obstacles or reduce speed in specific geolocations of the location.

25. The method of claim 16, wherein the controller is interfaced with one or more sensors to detect a condition of the modular robot.

26. The method of claim 16, wherein the modular robot is configured to interface with a sweeper module used for sweeping debris at the location, the method further includes,
sending, by the controller, data to the server regarding sensor data via a communications device of the modular robot, the sensor data is configured to identify a volume of said debris passing into a container of the sweeper module, the sensor data is associated with global positioning system (GPS) coordinate data at the location, the sensor data is usable to identify regions in the location that have increased or decreased amounts of said debris, and further using said sensor data to generate one or more additional zones at the location or update the work function for said regions.

27. The method of claim 16, wherein the modular robot is associated with a communications device that interfaces with said controller, the communications device is configured receive instructions from the server and send data collected at said location during operation, the data collected includes one or more of, identification of a hot spot, identification of a region that has an increased amount of debris, an identification of vehicles parked and blocking part of the surface at the location, identification of obstacles avoided at the location, a progress associated with completing the work function at the location, an error report from the modular robot, a fault from the sweeper module, an increase in current draw from the sweeper module, an increase in debris collected at specific geolocations, camera data collected at the location, or a combination of two or more thereof.

28. The method of claim 16, further comprising, sending, by the controller, data to the server regarding updates from the modular robot, the updates include information regarding a type of module being handled by the modular robot, wherein the type of module is one of a sweeper with brushes, or a scrubber with scrub brushes, or a vacuum with suction, or a mower for cutting grass or brush, or a polisher with a pad for polishing a surface, or a washer for washing a surface;

wherein the server provides access to a user interface that is accessible by a remote device over the internet, the user interface provides data regarding the location and controls for entering input settings for directing operation of the modular robot, or directing timing schedules of the modular robot, or receiving notifications from the modular robot, or receiving logs indicative of hot spots from the modular robot, or receiving alerts of accidents at the location from the modular robot, or receiving GPS coordinates of hot spots at the location from the modular robot, or receiving battery levels of the modular robot or module being handled by the modular robot, or a combination of two or more thereof.

* * * * *